US005809454A

United States Patent [19]
Okada et al.

[11] Patent Number: 5,809,454
[45] Date of Patent: Sep. 15, 1998

[54] AUDIO REPRODUCING APPARATUS HAVING VOICE SPEED CONVERTING FUNCTION

[75] Inventors: Shigeyuki Okada, Hashima; Hideki Yamauchi, Ogaki; Masayuki Iida; Hiroshi Tanaka, both of Yawata, all of Japan

[73] Assignee: Sanyo Electric Co., Ltd., Osaka, Japan

[21] Appl. No.: 678,370

[22] Filed: Jun. 28, 1996

[30] Foreign Application Priority Data

Jun. 30, 1995 [JP] Japan .................................... 7-166385

[51] Int. Cl.⁶ ....................................................... G10L 3/02
[52] U.S. Cl. ........................ 704/214; 704/215; 704/208; 704/211; 704/503
[58] Field of Search ................................. 395/2.16, 2.17, 395/2.19, 2.2, 2.23, 2.24, 2.69, 2.85, 2.87, 2.94, 806, 807; 704/207, 208, 210, 211, 214, 215, 260, 276, 278, 503

[56] References Cited

FOREIGN PATENT DOCUMENTS

07192392 A  7/1995  Japan .

OTHER PUBLICATIONS

Ikezawa et al., "A Method of Absorbing Temporal Enlargement of Speech Lengths in the Voice Speed Converting System for Elderly", Technical Report of IEICE, pp. 49–56, No Date.

"The Voice Speed Conversion Technique Progressing Toward Phase of Practical Use and Applied as the Basic Function of Audio Output Equipment" published by Nikkei Electronics on Nov. 21, 1994.

*Primary Examiner*—David R. Hudspeth
*Assistant Examiner*—Susan Wieland
*Attorney, Agent, or Firm*—Sheridan Ross, P.C.

[57] ABSTRACT

A audio reproducing apparatus includes an audio decoder and a voice speed converting unit. The audio decoder decodes an audio data stream to produce an audio signal. The voice speed converting unit converts the audio signal in such a manner that when a bit rate is higher than a normal bit rate, a pitch of a reproduced sound interval is the same as the pitch of the sound interval in a normal playback mode and a voice speed in the reproduced sound interval approaches a voice speed in a sound interval in the normal playback mode. The voice speed converting unit further performs voice speed conversion on the audio signal in such a manner that when the bit rate is lower than the normal bit rate, the sound interval is not noticeably interrupted.

18 Claims, 14 Drawing Sheets

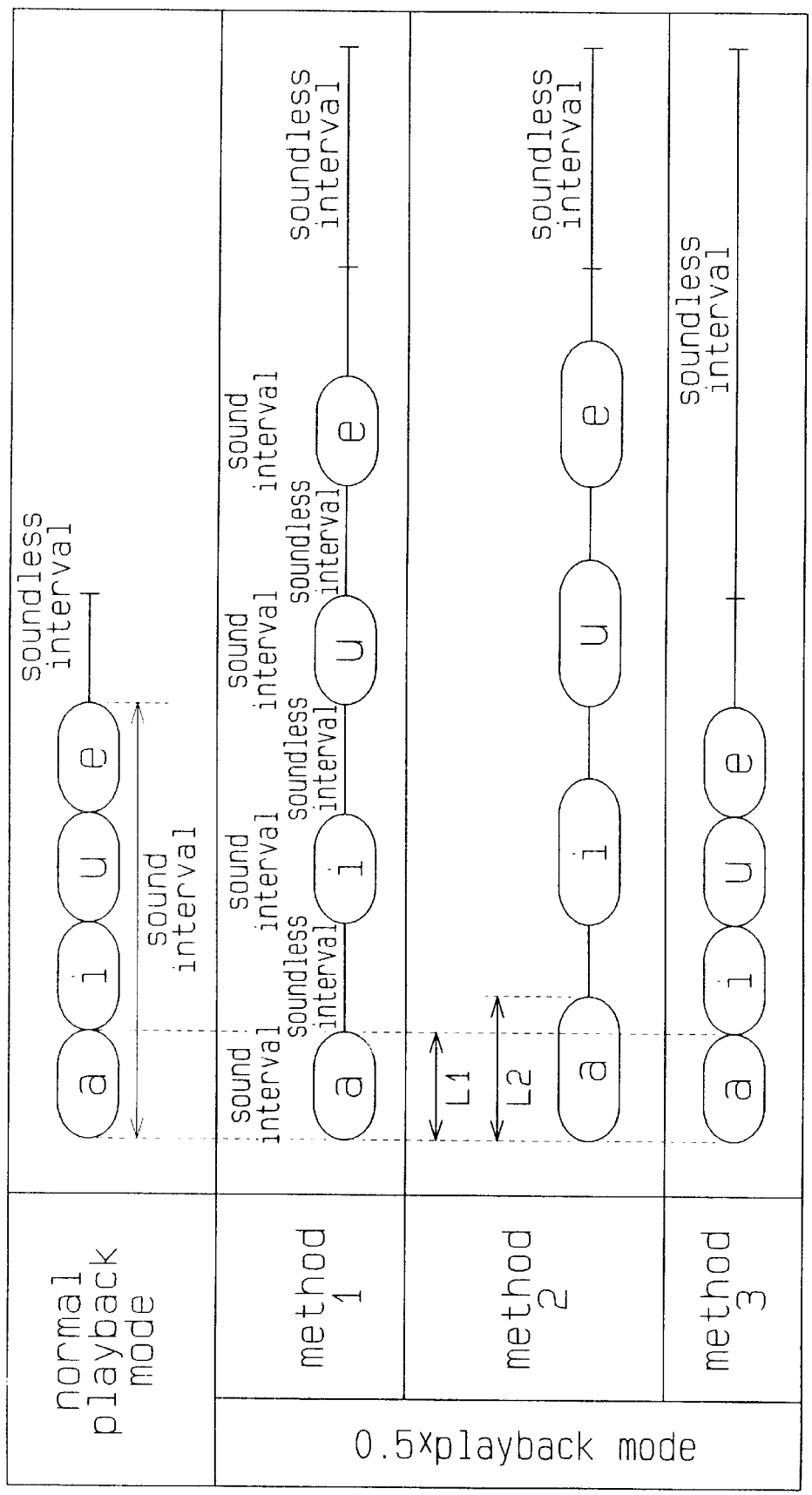

AUDIO REPRODUCING APPARATUS HAVING VOICE SPEED CONVERTING FUNCTION

BACKGROUND OF THE INVENTION

1. Field of the Invention

The present invention relates generally to an apparatus for reproducing compressed audio data by using an MPEG (moving picture experts group) technique. More particularly, the invention relates to an MPEG audio reproducing apparatus having a voice speed converting function and to an MPEG video/audio reproducing apparatus having the MPEG audio reproducing apparatus and a video decoder.

2. Description of the Related Art

Personal computers, as well as business and home entertainment systems, which handle a vast amount of and various types and forms of multimedia information, should process digitally recorded video and audio information at a fast speed. Such fast information processing can be achieved by data compression and expansion techniques, which directly affect the processing speed. The "MPEG" standards are one of such data compression and expansion techniques to improve the processing speed. The current MPEG standards are undergoing standardization by the MPEG Committee (ISO/IEC JTC1/SC29/WG11) under the ISO (International Organization for Standardization)/IEC (International Electrotechnical Commission).

The MPEG standards consist of three parts. Part 1 (ISO/IEC IS 11172-1: MPEG system part) defines the multiplex structure of video data and audio data and the synchronization system. Part 2 (ISO/IEC IS 11172-2: MPEG video part) defines the high efficiency coding system for video data and the format for video data. The part 3 (ISO/IEC IS 11172-3: MPEG audio part) defines the high efficiency coding system for audio data and the format for audio data.

Video data that is handled with respect to an MPEG video part includes moving pictures each consisting of several tens of (e.g., 30) frames per second. The video data has a six-layer structure of a sequence including a plurality of Groups Of Pictures (GOP's), GOP's each including a plurality of pictures, a plurality of slices in each picture, a plurality of macroblocks in each slice and a plurality of blocks in each macroblock.

At present, there are two MPEG standards, MPEG-1 and MPEG-2, that mainly differ in the encode rate at which video and audio data are encoded. In MPEG-1, frames correspond to pictures. In MPEG-2, either a frame or a field corresponds to a picture. Two fields constitute one frame. The structure where a frame corresponds to a picture is called a frame structure, while the structure where a field corresponds to a picture is called a field structure.

In MPEG, a compression technique called intra-frame prediction is employed. Intra-frame prediction compresses intra-frame data based on a chronological correlation among frames. Intra-frame prediction includes bidirectional prediction. Bidirectional prediction uses both forward prediction for predicting a current reproduced image (or picture) from an old reproduced image (or picture) and backward prediction for predicting a current reproduced image from a future reproduced image.

Bidirectional prediction uses I (Intra-coded) picture, P (Predictive-coded) picture and B (Bidirectionally-coded) picture. An I-picture is produced independently irrespective of old and future reproduced images. A P-picture is produced by forward prediction (prediction from an old decoded I- or P-picture). A B-picture is produced by bidirectional prediction. In bidirectional prediction, a B-picture is produced by one of the following three predictions.

(1) Forward Prediction: prediction from an old decoded I- or P-picture.
(2) Backward Prediction: prediction from a future decoded I- or P-picture.
(3) Bidirectional Prediction: prediction from old and future decoded I- or P-pictures.

An I-picture is produced without an old picture or a future picture, whereas every P-picture is produced by referring to an old picture and every B-picture is produced by referring to an old or future picture.

In intra-frame prediction, an I-picture is periodically produced first. Then, a frame several frames ahead of the I-picture is produced as a P-picture. This P-picture is produced by the prediction in one direction from the past to the present (forward direction). Next, a frame located before the I-picture and after the P-picture is produced as a B-picture. At the time this B-picture is produced, the optimal prediction scheme is selected from among forward prediction, backward prediction and bidirectional prediction. In general, a current image and its preceding and succeeding images in consecutive motion pictures are similar to one another and that they differ only partially. In this respect, it is assumed that the previous frame (e.g., I-picture) and the next frame (e.g., P-picture) are substantially the same. If there is a slight difference (B-picture data) between both frames, this difference is extracted and compressed. Accordingly, the intra-frame data can be compressed based on the chronological correlation among consecutive frames.

A series of video data encoded according to the MPEG video standards in the above manner is called an MPEG video bit stream. A series of audio data encoded according to the MPEG audio standards is called an MPEG audio bit stream. The video and audio stream are time-divisionally multiplexed according to the MPEG system part to generate an MPEG system bit stream.

An MPEG system encoder separately encodes video data and audio data to produce a video stream and an audio stream while maintaining relationship between both streams of data. Next, a multiplexer (MUX) incorporated in the MPEG system encoder multiplexes the video stream and audio stream in a way that matches the format of a transfer medium or a recording medium, thus producing a system stream. The system stream is either transferred from the MUX via the transfer medium to a external device or is recorded on the recording medium.

A demultiplexer (DMUX) incorporated in the MPEG system decoder separates the system stream into a video stream and an audio stream. Next, the system decoder separately decodes the individual streams to produce a decoded output (video output) associated with video and a decoded output (audio output) associated with audio. The video output is sent to a display, thus reproducing moving pictures on the display screen. The audio output is sent to a loud speaker via a D/A (Digital/Analog) converter and an audio amplifier, thus reproducing voices from the loud speaker.

MPEG-1 is mainly associated with storage media such as a CD (Compact Disc), a CD-ROM (Compact Disc-Read Only Memory) and a DVD (digital video disk), while MPEG-2 includes the MPEG-1 and is used in a wide range of applications.

Decoders using a storage medium are required to have the following two variable speed reproduction functions. (1) The function to reproduce moving pictures at a speed faster than the normal (standard) playback speed (hereinafter called "fast playback"). (2) The function to reproduce moving pictures at a speed slower than the normal playback speed (hereinafter called "slow playback").

The fast playback function is suitable for fast forward reproduction which allows the user to see moving pictures in a short period of time. The fast playback function is also suitable for the fast forward reproduction and fast reverse reproduction each of which allows the user to search for the desired moving picture. The slow playback function is suitable in, for example, the case where the user wants to carefully watch moving pictures.

The bit rate of a system stream read from a recording medium corresponds to the reading speed. To execute fast playback, it is necessary to read the system stream from the recording medium at a high speed. Executing slow playback requires that the system stream be read from the recording medium at a low speed. For example, when a video CD or DVD is used as a recording medium, making the rotational speed of the video CD or DVD faster or slower than that in the normal (standard) playback mode allows the system stream to be read out at the desired speed.

Although the variable speed playback of moving pictures has been considered in the MPEG, no consideration has been given to the variable speed reproduction of voices. The bit rate of an audio stream is the same as that of the system stream. In the fast playback mode for moving pictures, therefore, the bit rate of an audio stream becomes greater. As a result, the sound generating speed (voice speed) becomes faster in addition to an increase in the pitches of voices to be reproduced. In the slow playback mode for moving pictures, on the other hand, the bit rate of an audio stream becomes smaller. As a result, voices are reproduced intermittently though the pitches of the reproduced voices do not change. Therefore, users are likely to have a difficulty in hearing voices in the variable speed playback of moving pictures.

Recently, a voice speed conversion technique to arbitrarily control the voice speed without changing the pitches has been in development. Japanese Unexamined Patent Publication No. 7-192392 discloses a voice speed conversion technique and an LSI for voice speed conversion, which are adaptable for VTRs and tape recorders. This voice speed conversion technique was also described on pages 93 to 98 in Nikkei Electronics, Nov. 21, 1994 (No. 622).

The synchronous generation of sounds and moving pictures (video pictures) should take "lip sync" into consideration. The "lip sync" is the state of the movement of the mouth of a person on a display in synchronism with voices generated from a loudspeaker. Video and audio are out of lip sync or lip asynchronous when voices come out faster or slower than the corresponding movement of the mouth. When the lip asynchronism is out of the allowable range for the human audio sensitivity, it is disturbing for listeners. In general, the allowable time for the lip asynchronism caused by the slower generation of voices than the movement of moving pictures is said to be approximately 50 to 250 ms.

SUMMARY OF THE INVENTION

Accordingly, it is a primary objective of the present invention to provide an audio reproducing apparatus capable of reproducing voices that are natural and comfortable to hear, even in a variable speed playback mode.

It is another objective of this invention to provide a video/audio reproducing apparatus, which is equipped with an audio reproducing apparatus capable of reducing the time lag between the generation of voices and the movement of moving pictures, and a video decoder.

To achieve the foregoing and other objects and in accordance with the purpose of the present invention, an improved audio reproducing apparatus is provided. According to an embodiment of the invention, the audio reproducing apparatus includes an audio decoder and a voice speed converting unit. The audio decoder decodes an audio data stream to produce an audio signal. The voice speed converting unit receives the audio signal and performs voice speed conversion on the audio signal. The voice speed converting unit performs voice speed conversion on the audio signal in such a manner that when a bit rate is higher than a normal bit rate, a pitch of a sound interval to be reproduced becomes substantially the same as that in a normal playback mode and a voice speed in the sound interval approaches a voice speed in a sound interval in the normal playback mode. The voice speed converting unit further performs voice speed conversion on the audio signal in such a manner that when the bit rate is lower than the normal bit rate, interruption of the sound interval becomes less noticeable.

According to the embodiment of the invention, an audio/video reproducing apparatus includes an audio decoder, a voice speed converting unit and a video decoder. The audio decoder decodes an audio data stream to produce an audio signal. The voice speed converting unit performs voice speed conversion on the audio signal in such a manner that when a bit rate is higher than a normal bit rate, a pitch of a sound interval to be reproduced becomes substantially the same as that in a normal playback mode and a voice speed in the sound interval approaches a voice speed in a sound interval in the normal playback mode. The voice speed converting unit further performs voice speed conversion on the audio signal in such a manner that when the bit rate is lower than the normal bit rate, interruption of the sound interval becomes less noticeable. The video decoder decodes a video data stream to produce a video signal.

The audio/video reproducing apparatus may include an index adding circuit and an index detector. The index adding circuit adds an index signal as information associated with time to the audio signal before the audio signal is stored in a memory of the voice speed converting unit. The index detector detects the index signal added to the audio signal read from the memory, detects a signal delay time in the voice speed converting unit from time information acquired from the index signal and current time information, and supplies a signal indicating the signal delay time to the video decoder. The video decoder controls a self-operation timing based on the signal indicating the signal delay time.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings.

FIG. 3 exemplifies voices to be reproduced in the normal playback mode and in a 0.5× playback mode in the first embodiment;

DETAILED DESCRIPTION OF THE PREFERRED EMBODIMENTS

FIRST EMBODIMENT

Figure 1:
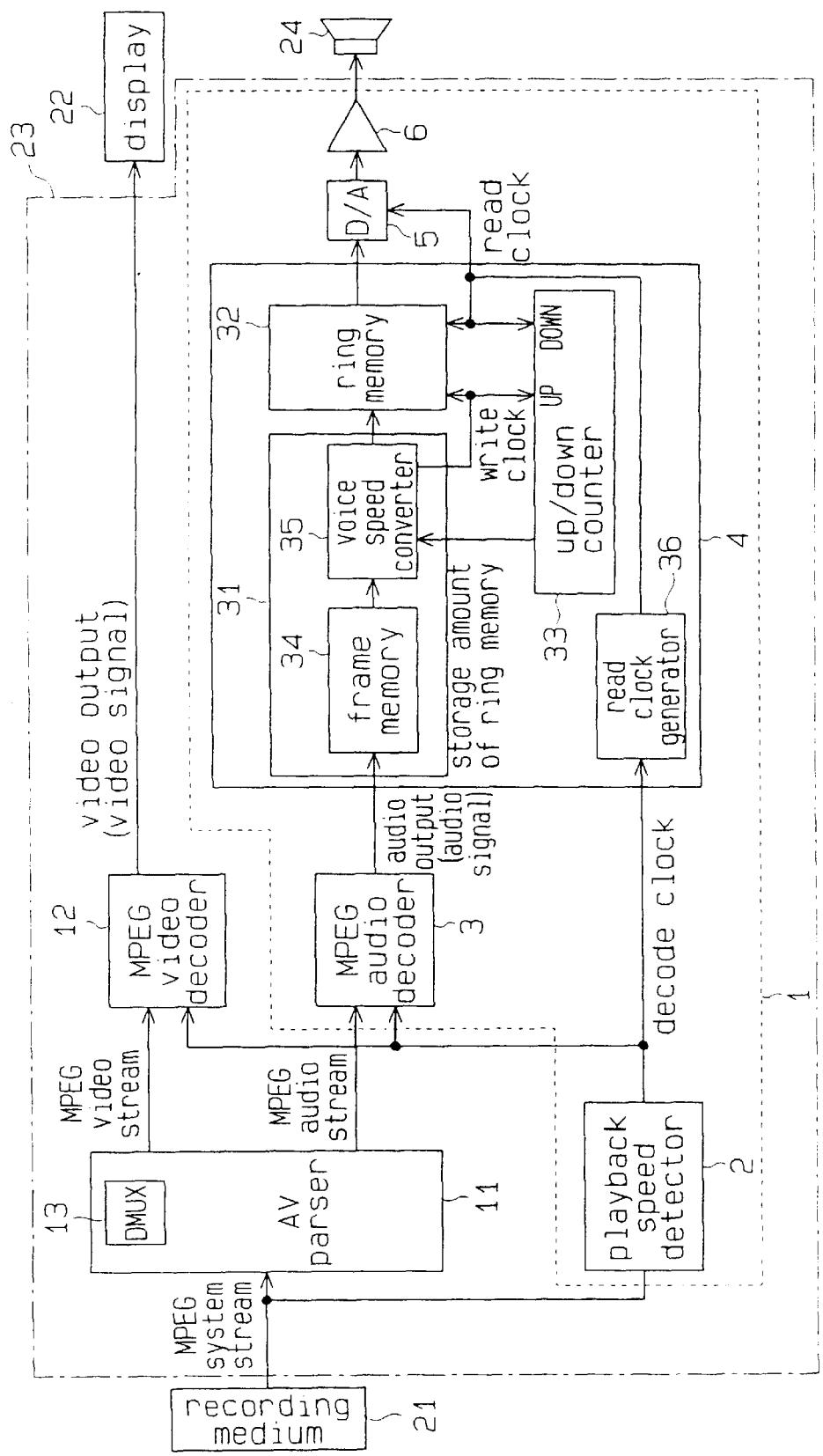
FIG. 1 is a block circuit diagram illustrating an MPEG video/audio reproducing apparatus including an MPEG audio reproducing apparatus according to the first embodiment of the invention.

The first embodiment of the present invention will now be described referring to the accompanying drawings. As shown in FIG. 1, an MPEG video/audio reproducing apparatus 23 includes an MPEG audio reproducing apparatus 1 according to the first embodiment, an audio video parser (AV parser) 11 and an MPEG video decoder 12. The MPEG audio reproducing apparatus 1 includes a playback speed detector 2, an MPEG audio decoder 3, a voice speed conversion processor 4, a D/A converter 5 and an audio amplifier 6. The individual circuits 2 through 6 are mountable on a single large scale integrated circuit (LSI) chip. The mounting of those circuits on the LSI chip permits the MPEG audio reproducing apparatus 1 to be compact. Further, the MPEG audio reproducing apparatus 1, the AV parser 11 and the MPEG video decoder 12 may be mounted on a single LSI chip. This allows the MPEG video/audio reproducing apparatus 23 to be compact.

The voice speed conversion processor 4 includes a DSP (Digital Signal Processor) 31, a ring memory 32, an up/down counter 33 and a read clock generator 36. The read clock generator 36 generates a read clock signal in accordance with a decode clock signal, and supplies this signal to the ring memory 32 and the D/A converter 5. Nikkei Electronics, Nov. 21, 1994 (No. 622), pages 93 to 98 gives the detailed description of the operation of the voice speed conversion processor.

The playback speed detector 2 generates the decode clock signal in accordance with the bit rate of an MPEG system stream read from a recording medium 21 such as a video CD or DVD, and supplies the decode clock signal to the MPEG video decoder 12; the MPEG audio decoder 3 and the voice speed conversion processor 4. The operations of those circuits 3, 4 and 12 are therefore defined by the decode clock signal.

The AV parser 11 includes a demultiplexer (DMUX) 13 and receives the MPEG system stream read from the recording medium 21. The DMUX 13 separates the system stream to an MPEG video stream and an MPEG audio stream, and supplies the video stream to the video decoder 12 and the audio stream to the audio decoder 3. The bit rate of the system stream read from the recording medium 21 corresponds to the reading speed.

The video decoder 12 decodes the video stream in conformity to the MPEG video part to produce video signals as video outputs. A display 22 receives the video signals from the video decoder 12 and reproduces moving pictures on the screen. The video decoder 12 produces video signals in accordance with the bit rate of the system stream. When the bit rate of the system stream is greater than that in the normal (standard) playback mode, therefore, moving pictures are reproduced on the display 22 at a high speed. When the bit rate of the system stream is smaller than that in the normal playback mode, moving pictures are reproduced on the display 22 at a low speed.

The audio decoder 3 decodes the audio stream in conformity to the MPEG audio part to produce digital audio signals as audio outputs. The voice speed conversion processor 4 receives the audio signals from the audio decoder 3, processes the audio signals and supplies the processed audio signals to the D/A converter 5. The D/A converter 5 performs D/A conversion of the processed audio signals using the frequency of the read clock signal as a sampling clock frequency, and supplies the resultant analog audio signals to the audio amplifier 6. The audio amplifier 6 amplifies the analog audio signals so that voices are reproduced from a loudspeaker 24. The audio decoder 3 produces audio signals in accordance with the bit rate of the system stream. Therefore, when the bit rate of the system stream is greater than that in the normal playback mode, the bit rate of audio signals becomes greater, and when the bit rate of the system stream is smaller than that in the normal playback mode, the bit rate of audio signals becomes smaller. The video decoder 12 and the audio decoder 3 respectively produce video signals and audio signals in synchronism with each other in the normal playback mode.

The DSP 31 includes a frame memory 34 and a voice speed converter 35. The frame memory 34 stores audio signals whose amount corresponds to the proper number of frames (e.g., two frames). One frame consists of the proper number of (e.g., 200) pieces of sampling data. The voice speed converter 35 receives audio signals from the frame memory 34 and performs voice speed conversion on the audio signals frame by frame to generate voice speed converted audio signals (hereinafter called "converted data"). The voice speed converter 35 produces a write clock signal and supplies this signal to the ring memory 32 and the up/down counter 33.

The frame memory 34 has an internal storage area which is separated to two areas: an A area and a B area. The frame memory 34 supplies one frame of audio signals, already stored in the A area, to the voice speed converter 35 at the same time as writing audio signals from the audio decoder 3 into the B area. Then, the frame memory 34 reads one frame of audio signals, stored in the B area, and supplies the audio signals to the voice speed converter 35, and simultaneously writes new audio signals from the audio decoder 3 into the A area.

The ring memory 32, which is a RAM (Random Access Memory) with an FIFO (First-In-First-Out) structure, stores converted data, produced by the voice speed converter 35, in accordance with the write clock signal. The converted data, stored in the ring memory 32, is read out in accordance with the read clock signal and is supplied to the D/A converter 5. This ring memory 32 may be connected to the preceding stage of the DSP 31, i.e., between the MPEG audio decoder 3 and the DSP 31, instead of at the subsequent stage of the DSP 31.

The up/down counter 33 has an up-count input terminal UP for receiving the write clock signal, and a down-count input terminal DOWN for receiving the read clock signal. The up/down counter 33 counts the difference between the total number of pulses of the write clock signal and the total number of pulses of the read clock signal. The count value corresponds to the amount of converted data stored in the ring memory 32. The computation of the count value in this manner permits the up/down counter 33 to detect the amount of data stored in the ring memory 32. The count value indicating the storage amount of the ring memory 32 is supplied to the voice speed converter 35.

Figure 2:
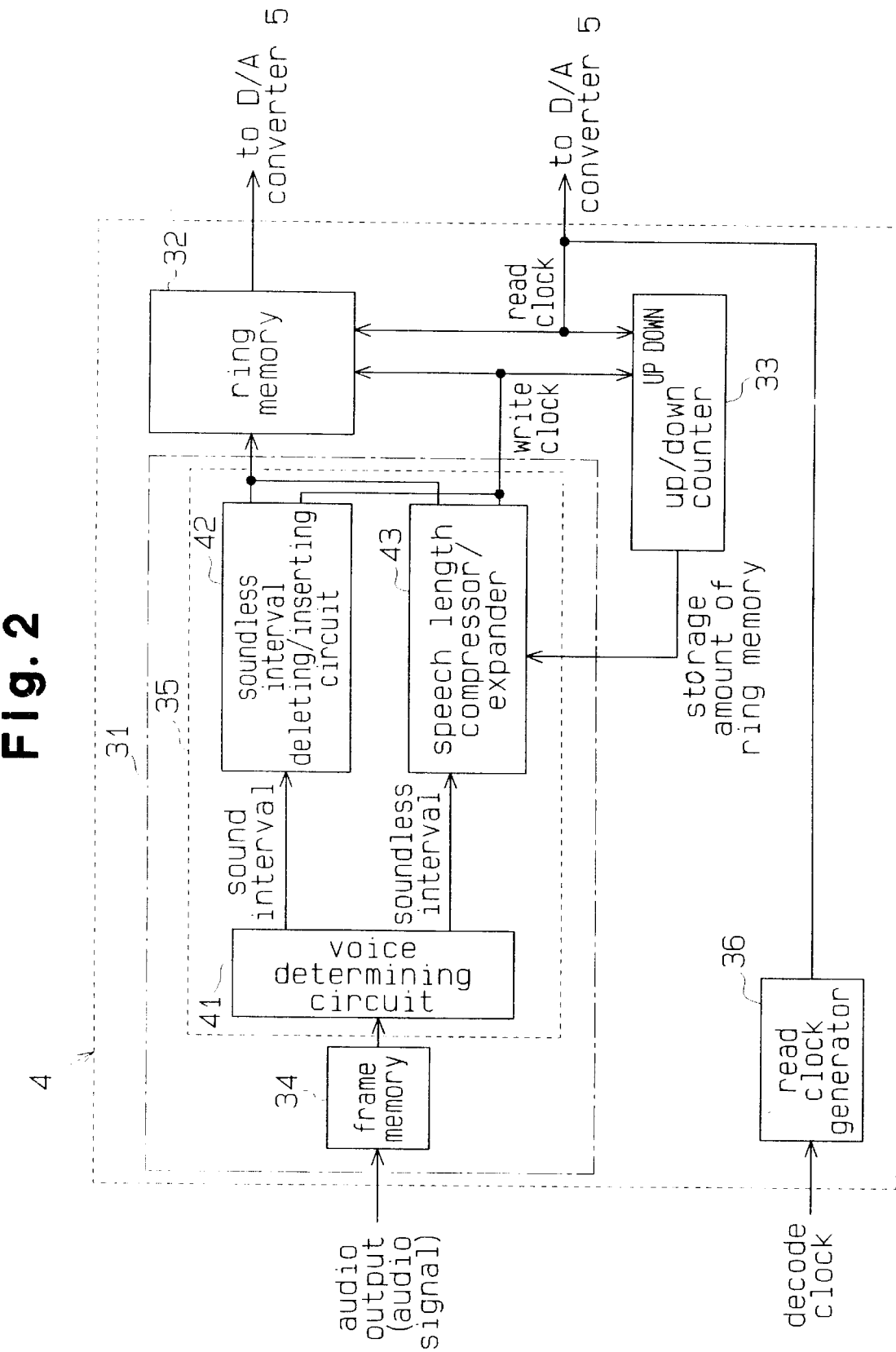
FIG. 2 is a block circuit diagram showing a voice speed converter in the MPEG audio reproducing apparatus in FIG. 1.

As shown in FIG. 2, the voice speed converter 35 includes a voice determining circuit 41, a soundless interval deleting/inserting circuit 42 and a speech length compressor/expander 43. The voice determining circuit 41 determines if the audio signal read from the frame memory 34 belongs to a sound interval (where sounds are present) or a soundless interval (where no sounds are present). Background noise other than those voices generated by human beings are treated as belonging to the soundless interval. The soundless interval deleting/inserting circuit 42 deletes the soundless interval determined by the voice determining circuit 41 or inserts a new soundless interval. The speech length compressor/expander 43 compresses or expands the sound interval determined by the voice determining circuit 41 in accordance with the storage amount of the ring memory 32. The soundless interval deleting/inserting circuit 42 and the speech length compressor/expander 43 generate the write clock signal according to the contents of their processes.

Voice Speed Conversion In Fast Playback Mode

In the fast playback mode, the voice speed converter 35 performs voice speed conversion in such a way that the pitches of voices to be reproduced from the loudspeaker 24 are set substantially the same, and the voice speed approaches the speed in the normal playback mode. The bit rate of audio signals in the fast playback mode is faster (greater) than the bit rate in the normal playback mode. When audio signals are sent to the D/A converter 5 in the fast playback mode at a bit rate faster than the one in the normal playback mode without the voice speed conversion, therefore, the pitches of voices to be reproduced from the loudspeaker 24 increase and the voice speed becomes faster.

To avoid this phenomenon, the soundless interval deleting/inserting circuit 42 computes the uninterrupted length of the soundless interval determined by the voice determining circuit 41 and eliminates this soundless interval when the continuous length of the soundless interval is equal to or greater than a predetermined length. For example, pitch extraction from the sound interval determined by the voice determining circuit 41 is performed by the speech length compressor/expander 43 using the self correlation, and the extracted pitch waveform is subjected to compression. As a result, in the fast playback mode where audio signals are supplied at a high bit rate, the time length (time axis) of the sound interval to be reproduced from the loudspeaker 24 is expanded. The speech length ratio of the compression performed by the speech length compressor/expander 43 dynamically varies in accordance with the status of a soundless interval and the storage amount of the ring memory 32.

For instance, the compression of 3-period waveforms having the same pitch periods to 2-period waveforms ensures the compression ratio to be increased by $2/3$ times (compression ratio: $2/3$). Specifically, preceding 2-period waveforms located along the time axis and the subsequent 2-period waveforms are extracted from the 3-period waveforms. Then, the preceding 2-period waveforms are multiplied by a trigonometric window function which monotonously decreases and the subsequent 2-period waveforms are multiplied by a trigonometric window function which monotonously increases. An output waveform is acquired by adding the acquired two multiplication results (waveforms). To ensure 0.9× compression ratio (compression ratio: 0.9), for example, 10-period waveforms are compressed to 9-period waveforms. In this case, the first 3-period waveforms in the 10-period waveforms are compressed to 2-period waveforms in the same manner as has been described, and the remaining 7-period waveforms are not compressed.

Preparing various combinations in compressing M-period waveforms to N-period waveforms can provide multifarious compression ratios. When the soundless interval is short and the compression ratio is low (the degree of compression is large), the ring memory 32 may overflow. To avoid such overflow, it is preferable to dynamically alter the compression ratio of the speech length compressor/expander 43 in accordance with the storage amount of the ring memory 32. When background noise is present in a soundless interval, a sound interval and pitch may be extracted erroneously. To prevent this erroneous operation, it is preferable to alter the detection level of the sound interval of the voice determining circuit 41 in accordance with the noise signal.

In the first embodiment, as apparent from the above description, the MPEG audio reproducing apparatus equipped with the voice speed conversion processor 4 can set the pitches of voices to be reproduced in the fast playback mode substantially the same and allows the voice speed to approach that in the normal playback mode. This feature can provide the user with voices which are natural and are pleasantly audible.

In the m (m>1) times fast playback mode, the bit rates of an audio stream and the decode clock signal become m times faster than those in the normal playback mode. The voice speed converter 35 converts the bit rate in such a manner that the bit rate of converted data to be output from the voice speed converter 35 becomes substantially the same as the bit rate in the normal playback mode. This conversion allows pitches of voices to be set substantially the same as those in the normal playback mode. In other words, the voice speed converter 35 alters the bit rate to "1" from "m" to set the pitches of voices to be reproduced substantially the same as those in the normal playback mode.

Voice Speed Conversion In Slow Playback Mode

It is assumed that the individual sound intervals ("a", "i", "u" and "e") are linked and continuous in the normal playback mode as shown in FIG. 3.

In the slow playback mode, the bit rate of an audio signal becomes lower (smaller) than that in the normal playback mode. When audio signals are supplied directly to the D/A converter 5 at a low bit rate, as indicated by the method 1, voices to be reproduced from the loudspeaker 24 come out intermittently although the pitches of those voices do not change as compared with the case of the normal playback mode. More specifically, while the time lengths (pitches) of the individual sound intervals ("a", "i", "u" and "e") do not differ from those in the normal playback mode, a soundless interval where no voices are present is inserted between the sound intervals, resulting in the intermittent reproduction of voices. The insertion of this soundless interval is disturbing to the user. To make the sound interruption caused by the soundless interval less noticeable, the voice speed converter 35 performs the voice speed conversion as indicated by the method 2 or the method 3. Because the pitches of voices do not change in the slow playback mode in the MPEG audio, the pitch alteration by the speech length compressor/expander 43 in the fast playback mode becomes unnecessary.

Method 2: The speech length compressor/expander 43 expands the time length of each sound interval. The soundless interval deleting/inserting circuit 42 shortens the time length of each soundless interval to make voice interruption less noticeable. To expand the time length of each sound interval, for example, the speech length compressor/expander 43 extracts the pitch from each sound interval by using the self correlation and expands the extracted pitch waveform. The pitch is determined by the voice determining circuit 41. For instance, expanding 2-period waveforms having the same pitch periods to 3-period waveforms permits the expansion ratio to be increased by 3/2 times (expansion ratio: 3/2). Likewise, expanding 3-period waveforms to 4-period waveforms permits the expansion ratio to be increased by 4/3 times (expansion ratio: 4/3). This expansion process allows the time length of each sound interval reproduced from the loudspeaker 24 to be expanded in the slow playback mode where audio signals are supplied at a low bit rate. Excessive expansion of sound intervals causes the user to hear slow voices. While the sound interruption becomes less noticeable, the voices reproduced still remain unnatural. To prevent such unnaturalness, the time length L2 of a sound interval in the slow playback mode is set, for example, as indicated by the following equation with respect to the time length L1 of a sound interval in the normal playback mode.

$$L2/L1 \leq 1.4$$

This equation is applicable to the slow playback mode of any magnification including 0.5× slow playback mode. The expansion ratio of a sound interval in the speech length compressor/expander 43 may be set to a constant value. Moreover, the expansion ratio may be set variably as discussed below.

The expansion ratio of a sound interval may be set dynamically in accordance with the storage amount of the ring memory 32. When a soundless interval is short and the expansion ratio of a sound interval is large (the degree of expansion is great), the ring memory 32 may overflow. To prevent this overflow, it is preferable that control should be so executed as to decrease the expansion ratio of a sound interval.

Figure 4A:
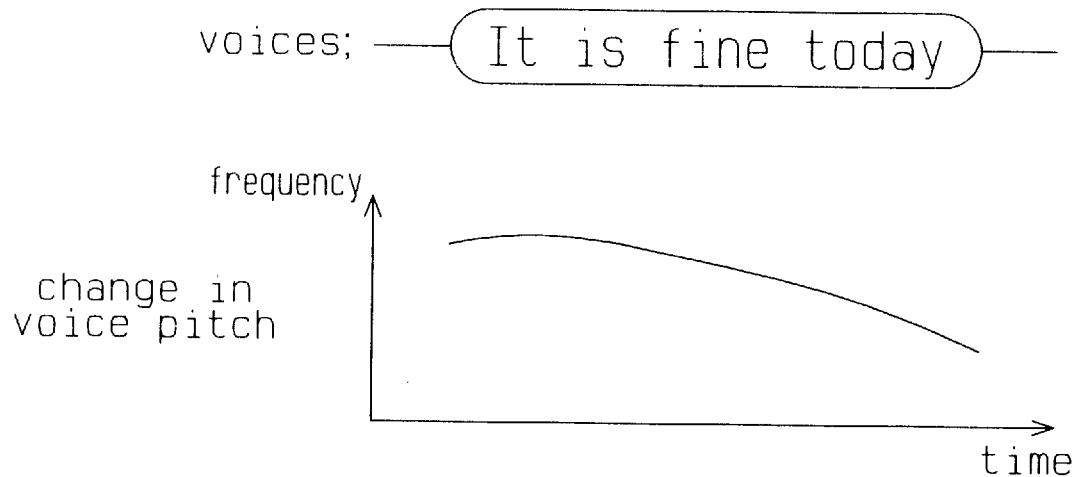
FIG. 4A is a graph showing the relationship between a change in the pitches of voices and time in the first embodiment.
Figure 4B:
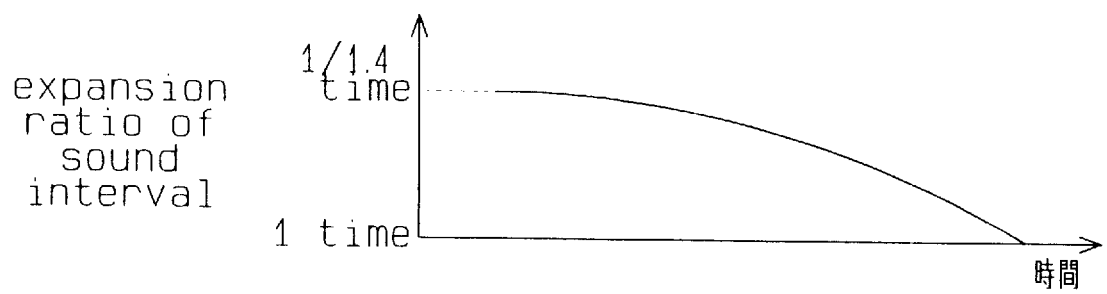
FIG. 4B is a graph showing the relationship between the speech length ratio of a sound interval, which varies in accordance with the pitch change, and time.
Figure 4C:
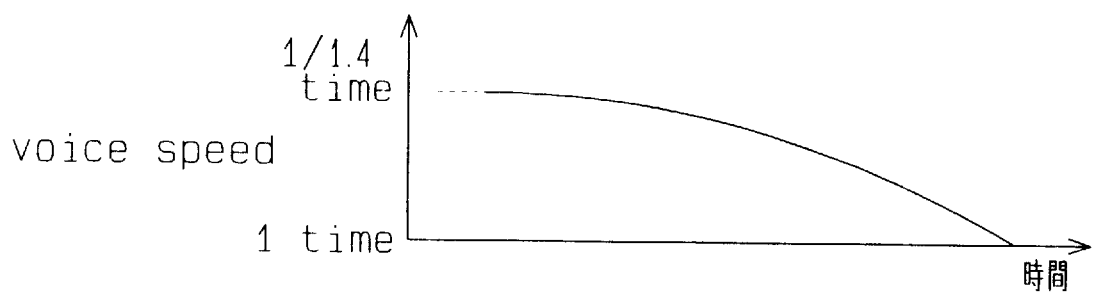
FIG. 4C is a graph showing the relationship between the voice speed, which varies in accordance with the speech length ratio of a sound interval, and time.

The expansion ratio of a sound interval may be dynamically altered in accordance with a change in the pitches of voices. As shown in FIGS. 4A to 4C, the voice speed is changed by altering the expansion ratio of a sound interval in accordance with a change in the pitches of voices. The alteration of the voice speed can further improve the pleasantness of the reproduced voices. The technique of varying the voice speed by altering the expansion ratio of a sound interval in accordance with a change in the pitches of voices is known (see TECHNICAL REPORT OF IEICE, SP92-56, HC92-33 (1992-09), pp. 49–56.)

Method 3: After removing each soundless interval and linking individual sound intervals, the soundless interval deleting/inserting circuit 42 newly inserts a soundless interval after each sound interval. This method makes voice interruption less noticeable. A soundless interval to be inserted may be any one of the following three types.

1. Soundless interval where no voices are present at all.
2. Soundless interval which includes white noise such that the listener is not disturbed. Such white noise should be previously prepared and stored in a separate memory (not shown).
3. A separate memory (not shown) is provided to store the audio signal that has been determined as belonging to a soundless interval by the voice determining circuit 41. The soundless interval deleting/inserting circuit 42 inserts the audio signal stored in that memory as a soundless interval.

According to the first embodiment, as discussed above, the MPEG audio reproducing apparatus equipped with the voice speed conversion processor 4 can make voice interruption less noticeable. This feature can provide the user with voices that are natural and pleasant. The MPEG audio reproducing apparatus 1 according to the first embodiment may use the methods 2 and 3 as follows.

The MPEG audio reproducing apparatus 1 may selectively use the voice speed conversion according to the method 2 or voice speed conversion according to the method 3, as desired. This modification allows the voice speed conversion to be performed in accordance with the audio characteristics of individual users, thus providing each user with pleasant reproduced voices.

The MPEG audio reproducing apparatus 1 may automatically select either the method 2 or the method 3 in accordance with the magnification of the slow playback. For instance, the MPEG audio reproducing apparatus 1 may be designed to select the method 3 in the playback mode with a magnification of 1 to 0.5 and select the method 2 in the playback mode with a magnification of lower than 0.5. In this way, the user can be provided with natural reproduced voices according to the playback speed.

SECOND EMBODIMENT

Figure 5:
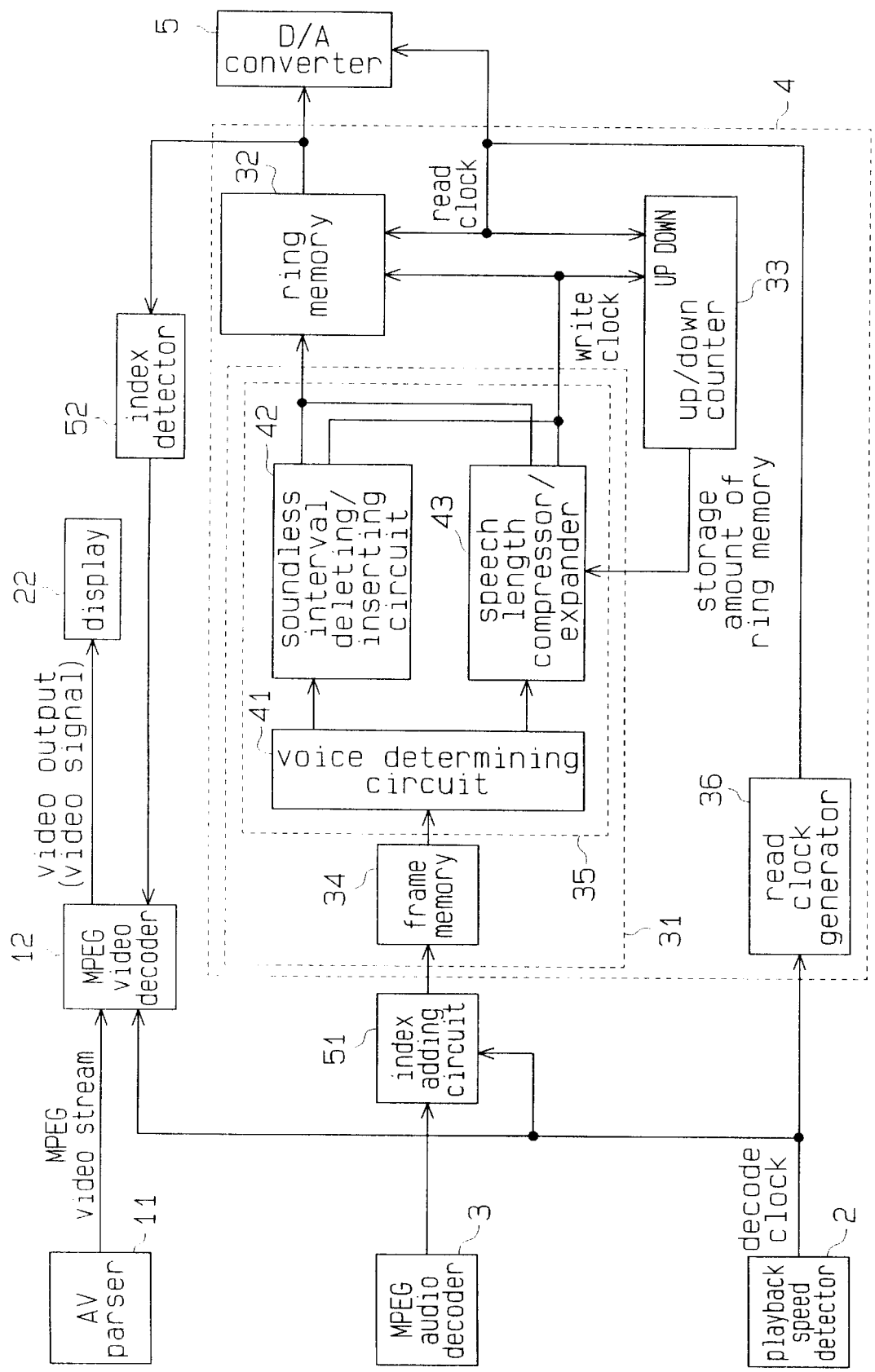
FIG. 5 is a block circuit diagram illustrating an MPEG video/audio reproducing apparatus according to the second embodiment of the invention.

The second embodiment of this invention will now be described referring to the accompanying drawings. To avoid a redundant description, like or same reference numerals are given to those components that are the same as the corresponding components of the first embodiment. As shown in FIG. 5, the MPEG video/audio reproducing apparatus according to the second embodiment includes the MPEG audio reproducing apparatus 1, the AV parser 11, the MPEG video decoder 12, an index adding circuit 51 and an index detector 52.

The index adding circuit 51 is connected to the preceding stage of the frame memory 34, i.e., between the MPEG audio decoder 3 and the voice speed conversion processor 4.

The index adding circuit 51 adds an index signal to an audio signal, produced by the audio decoder 3, at a given period in accordance with the decode clock signal, and supplies the index-affixed audio signal to the frame memory 34.

The index detector 52 detects the index signal affixed to data which has undergone the voice-speed conversion and has been read from the ring memory 32. The index detector 52 further computes a time Δt needed for the voice speed conversion processor 4 to perform signal processing from time information obtained from the index signal and current time information. The index detector 52 supplies a signal associated with the computed time Δt to the MPEG video decoder 12. In accordance with the signal associated with the computed time Δt, the video decoder 12 controls the timing of the self operation. The use of the index permits the converted data read from the ring memory 32 and the video signal produced by the video decoder 12 to be synchronized with each other.

In the normal playback mode, the video signal produced by the video decoder 12 and the audio signal produced by the audio decoder 3 are synchronized with each other. The location of the voice speed conversion processor 4 between the audio decoder 3 and the D/A converter 5 delays the audio signal by the time (delay time) needed for the voice speed conversion processor 4 to perform signal processing. This delay prevents the video signal from being synchronized with the audio signal. According to the second embodiment, the index adding circuit 51 is used to previously add the index signal to the audio signal to be supplied to the frame memory 34, at a given period. The index detector 52 detects this index signal to compute the time Δt needed for the voice speed conversion processor 4 to execute signal processing, and supplies a signal associated with the computed time Δt to the MPEG video decoder 12.

In accordance with this received signal associated with the computed time Δt, the video decoder 12 delays the self-operation timing. When the index detector 52 newly detects the next index signal, the video decoder 12 delays or quickens the self-operation timing in accordance with the difference between the currently computed time and the previously computed time. As a result, the audio signal subjected to the voice speed conversion and read from the ring memory 32 is synchronized with the video signal regardless of the delay time of the voice speed conversion processor 4. This signal synchronization reduces the time lag between voices reproduced from the loudspeaker 24 and the movement of moving pictures on the display 22, so that the lip asynchronization falls within the allowable audible range of human beings.

The index signal affixed to an audio signal may be eliminated by a soundless interval deleting/inserting circuit 42. In such a case, it is preferable that a sufficient number of index signals be added to an audio signal in a short period of time in such a way that a given number or greater number of index signals remain in the converted data read from the ring memory 32. This affixing of the index signals allows a given number or greater number of index signals to remain even if some of the affixed index signals are removed by the soundless interval deleting/inserting circuit 42. The remaining index signals can be used for synchronization of the audio signal with the video signal.

THIRD EMBODIMENT

Figure 6:
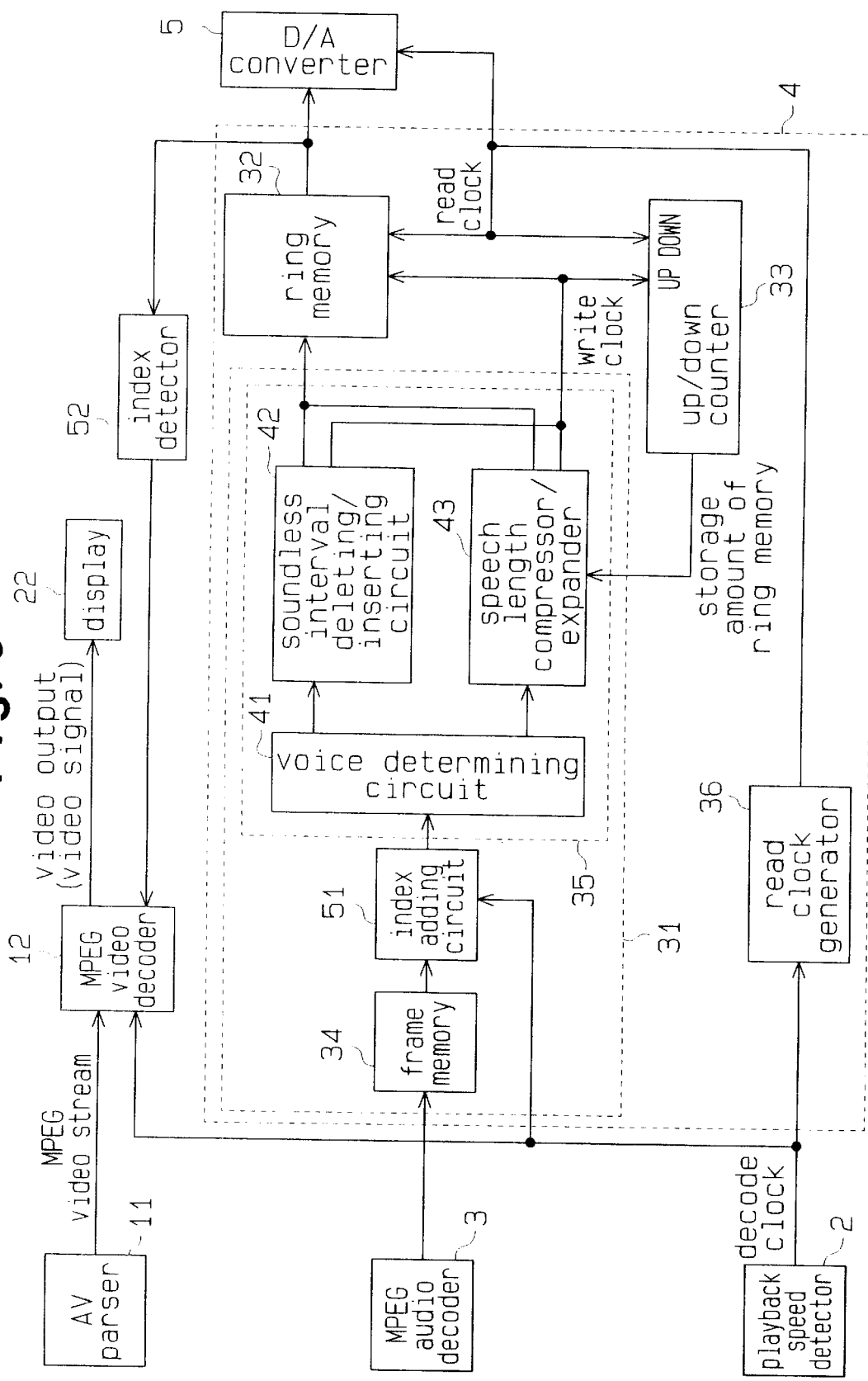
FIG. 6 is a block circuit diagram illustrating an MPEG video/audio reproducing apparatus according to the third embodiment of the invention.

The third embodiment of this invention will now be described referring to the accompanying drawings. To avoid a redundant description, like or same reference numerals are given to those components which are the same as the corresponding components of the second embodiment. As shown in FIG. 6, the index adding circuit 51 is connected between the frame memory 34 and the voice determining circuit 41 in the voice speed conversion processor 4 in the third embodiment. The index adding circuit 51 adds an index signal to an audio signal, read from the frame memory 34, at a given period in accordance with the decode clock signal, and supplies the index-affixed audio signal to the voice determining circuit 41.

The sufficient memory capacity of the frame memory 34 for storing two frames of audio signals is as small as, for example, 0.8 Kbytes. Therefore, the time needed for writing or reading data into or from the frame memory 34 (i.e., the delay time) is shorter than the delay time of the voice speed conversion processor 4. In view of the above, the delay time of the frame memory 34 may be neglected. As apparent from the above, the MPEG video/audio reproducing apparatus according to the third embodiment permits the audio signal and video signal to be synchronized with each other as per the second embodiment.

FOURTH EMBODIMENT

Figure 7:
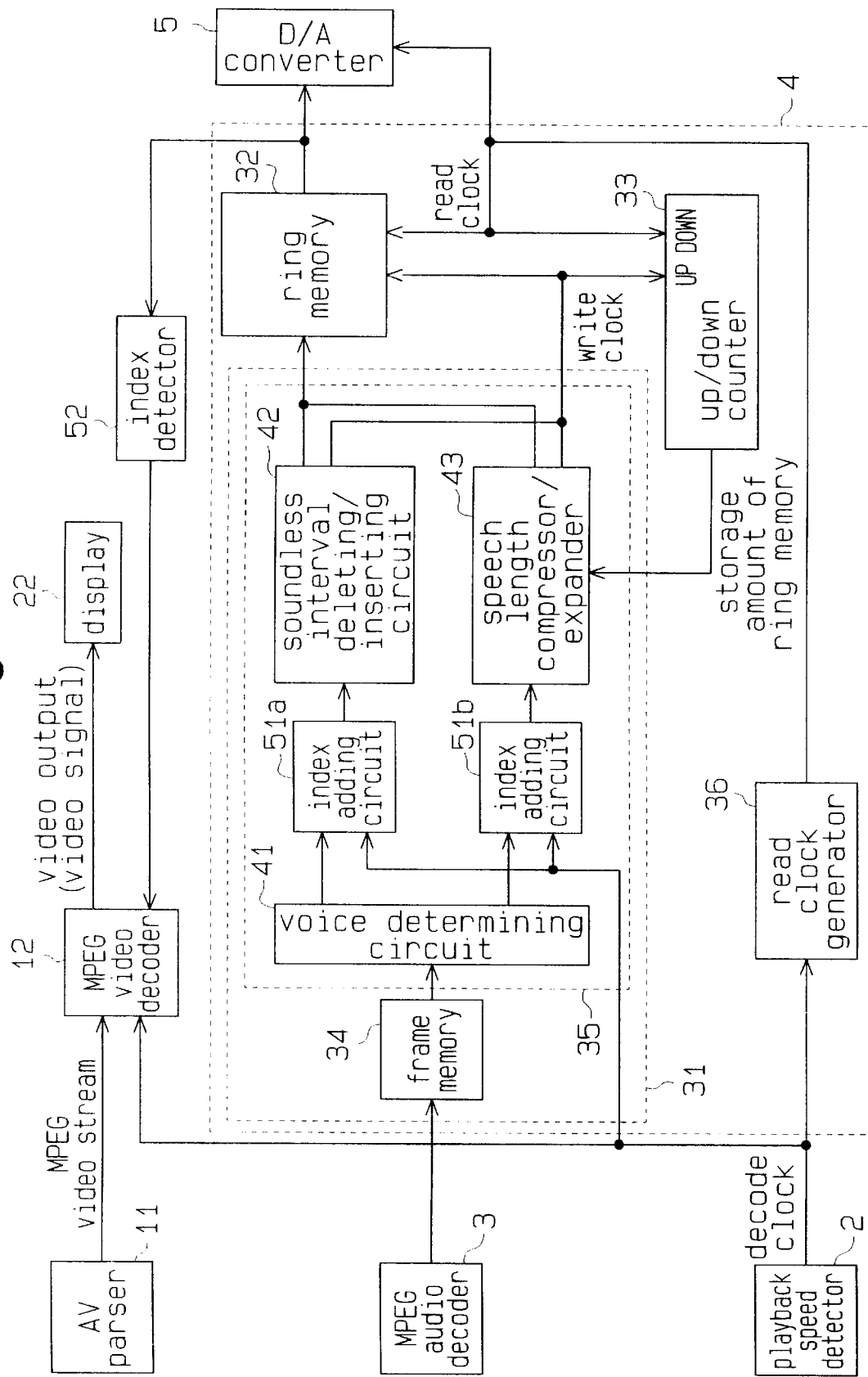
FIG. 7 is a block circuit diagram illustrating an MPEG video/audio reproducing apparatus according to the fourth embodiment of the invention.

The fourth embodiment of this invention will now be described referring to the accompanying drawings. To avoid a redundant description, like or same reference numerals are given to those components that are the same as the corresponding components of the second embodiment. As shown in FIG. 7, a first index adding circuit 51a is connected between the voice determining circuit 41 and the soundless interval deleting/inserting circuit 42, and a second index adding circuit 51b is connected between the voice determining circuit 41 and the speech length compressor/expander 43 in the fourth embodiment. The first index adding circuit 51a adds an index signal to an audio signal, processed by the voice determining circuit 41, at a given period in accordance with the decode clock signal and supplies the index-affixed audio signal to the soundless interval deleting/inserting circuit 42. The second index adding circuit 51b adds an index signal to an audio signal, processed by the voice determining circuit 41, at a given period in accordance with the decode clock signal and supplies the index-affixed audio signal to the speech length compressor/expander 43.

As has been mentioned in the foregoing description of the third embodiment, the frame memory 34 has a small memory capacity. Because the delay time of the frame memory 34 is shorter than the delay time of the voice speed conversion processor 4, the delay time of the frame memory 34 may be neglected. Further, the time needed for the signal processing in the voice determining circuit 41 (i.e., the delay time) is shorter than the operational delay time of the voice speed conversion processor 4, the delay time of the voice determining circuit 41 may be neglected. As apparent from the above, the MPEG video/audio reproducing apparatus according to the fourth embodiment permits the audio signal and video signal to be synchronized with each other as per the second embodiment.

FIFTH EMBODIMENT

Figure 8:
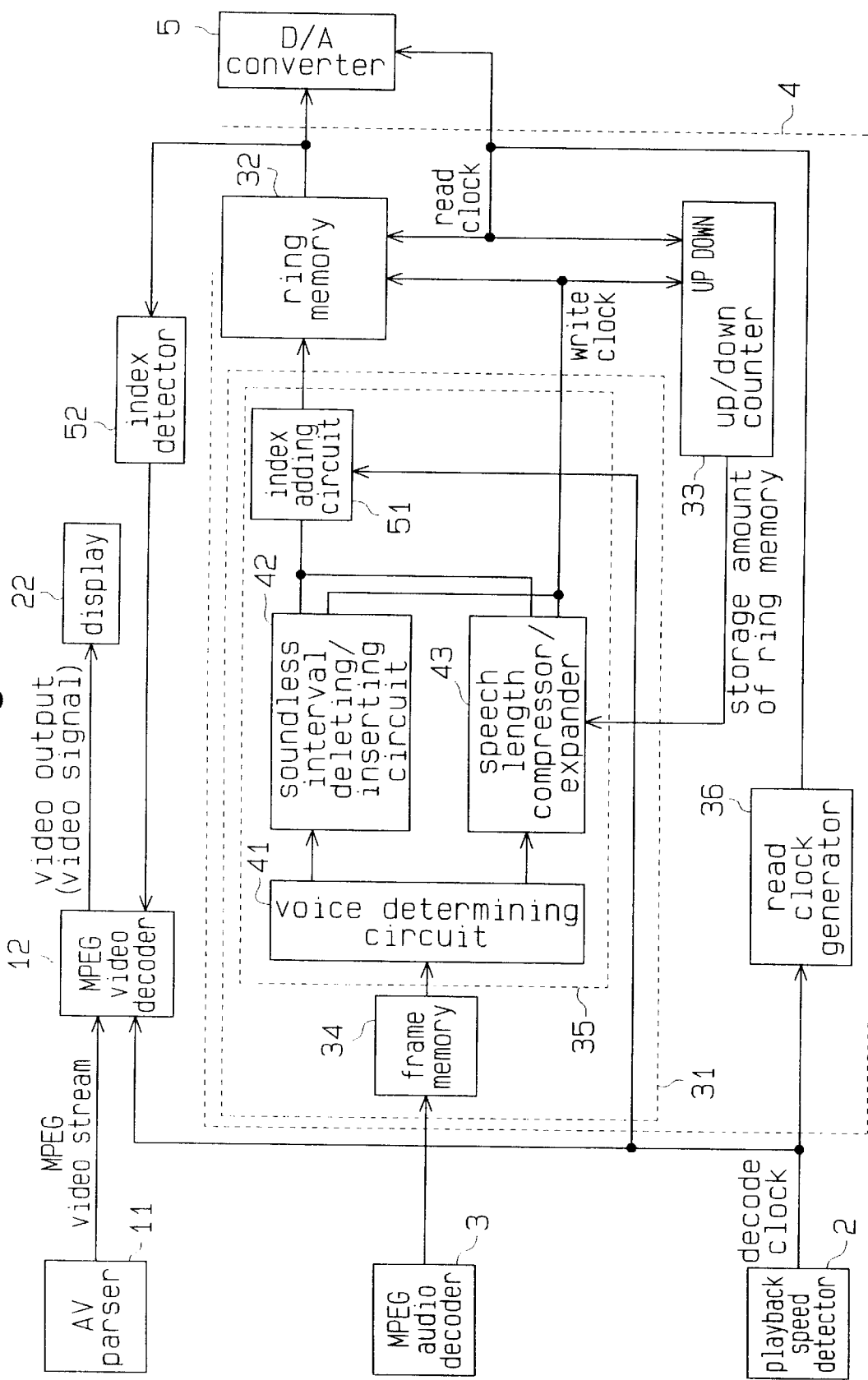
FIG. 8 is a block circuit diagram illustrating an MPEG video/audio reproducing apparatus according to the fifth embodiment of the invention.

The fifth embodiment of this invention will now be described referring to the accompanying drawings. To avoid a redundant description, like or same reference numerals are given to those components that are the same as the corresponding components of the second embodiment. As shown in FIG. 8, the index adding circuit 51 is connected between the soundless interval deleting/inserting circuit 42 and the ring memory 32. The index adding circuit 51 is further connected to the speech length compressor/expander 43. The index adding circuit 51 adds an index signal to audio signals, respectively processed by the soundless interval deleting/inserting circuit 42 and the speech length compressor/expander 43, at a given period in accordance with the decode clock signal. The index adding circuit 51 supplies each index-affixed audio signal to the ring memory 32.

As has been mentioned in the foregoing description of the third embodiment, the frame memory 34 has a small memory capacity. Because the delay time of the frame memory 34 is shorter than the delay time of the voice speed conversion processor 4, therefore, the delay time of the frame memory 34 may be neglected. Further, the times needed for the signal processes of the voice determining circuit 41, the soundless interval deleting/inserting circuit 42 and the speech length compressor/expander 43 (i.e., the delay times) are shorter than the delay time of the voice speed conversion processor 4, the delay times of the individual circuits 41, 42 and 43 may be neglected. In other words, the delay time of the voice speed conversion processor 4 is mainly determined by the time needed for data writing and data reading in and from the ring memory 32.

As apparent from the above, the MPEG video/audio reproducing apparatus according to the fifth embodiment permit the audio signal and video signal to be synchronized with each other as per the second embodiment. Since the index adding circuit 51 is connected to the subsequent stage of the soundless interval deleting/inserting circuit 42, no index signals affixed to an audio signal are not eliminated by the soundless interval deleting/inserting circuit 42. This feature permits all the affixed index signals to be used and can thus reduce the total number of index signals. It is therefore possible to reduce the circuit scale of the index adding circuit 51.

SIXTH EMBODIMENT

Figure 9:
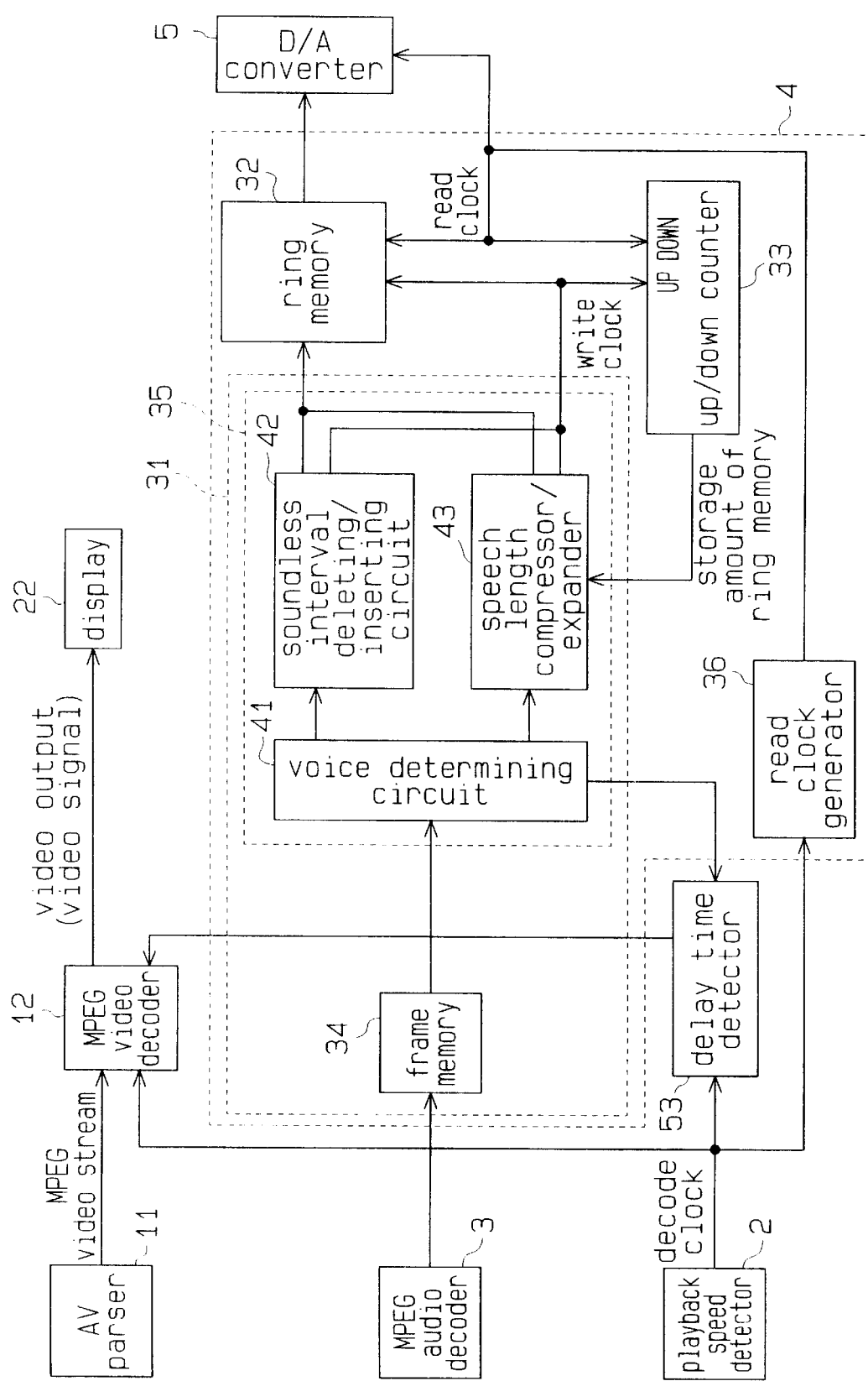
FIG. 9 is a block circuit diagram illustrating an MPEG video/audio reproducing apparatus according to the sixth embodiment of the invention.

The sixth embodiment of this invention will now be described referring to the accompanying drawings. To avoid a redundant description, like or same reference numerals are given to those components that are the same as the corresponding components of the first embodiment. As shown in FIG. 9, the MPEG video/audio reproducing apparatus according to the sixth embodiment has the MPEG audio reproducing apparatus 1, the AV parser 11, the MPEG video decoder 12, and a delay time detector 53.

The delay time detector 53 detects the delay time of the voice speed conversion processor 4 based on the result of the processing in the voice determining circuit 41 and the decode clock signal and supplies the detection signal to the MPEG video decoder 12. The video decoder 12 controls the self-operation timing based on the detection signal. This control allows the converted data read from the ring memory 32 and the video signal produced by the video decoder 12 to be synchronized with each other.

As discussed above, the voice determining circuit 41 determines whether the audio signal read from the frame memory 34 belongs to a sound interval or a soundless interval. The result of the processing in the voice determining circuit 41 includes voice information indicating if the audio signal is located in a sound interval. The decode clock signal corresponds to the bit rate of a system stream. The decode clock signal includes compression/expansion information associated with the compression/expansion ratio of an audio signal. The delay time detector 53 detects (computes) the delay time of the voice speed conversion processor 4 based on the voice information and compression/expansion information. The video decoder 12 delays the self-operation timing by the detected delay time. Consequently, the audio signal converted by the voice speed conversion and read from the ring memory 32 and the video signal are synchronized with each other regardless of the delay time of the voice speed conversion processor 4.

SEVENTH EMBODIMENT

Figure 10:
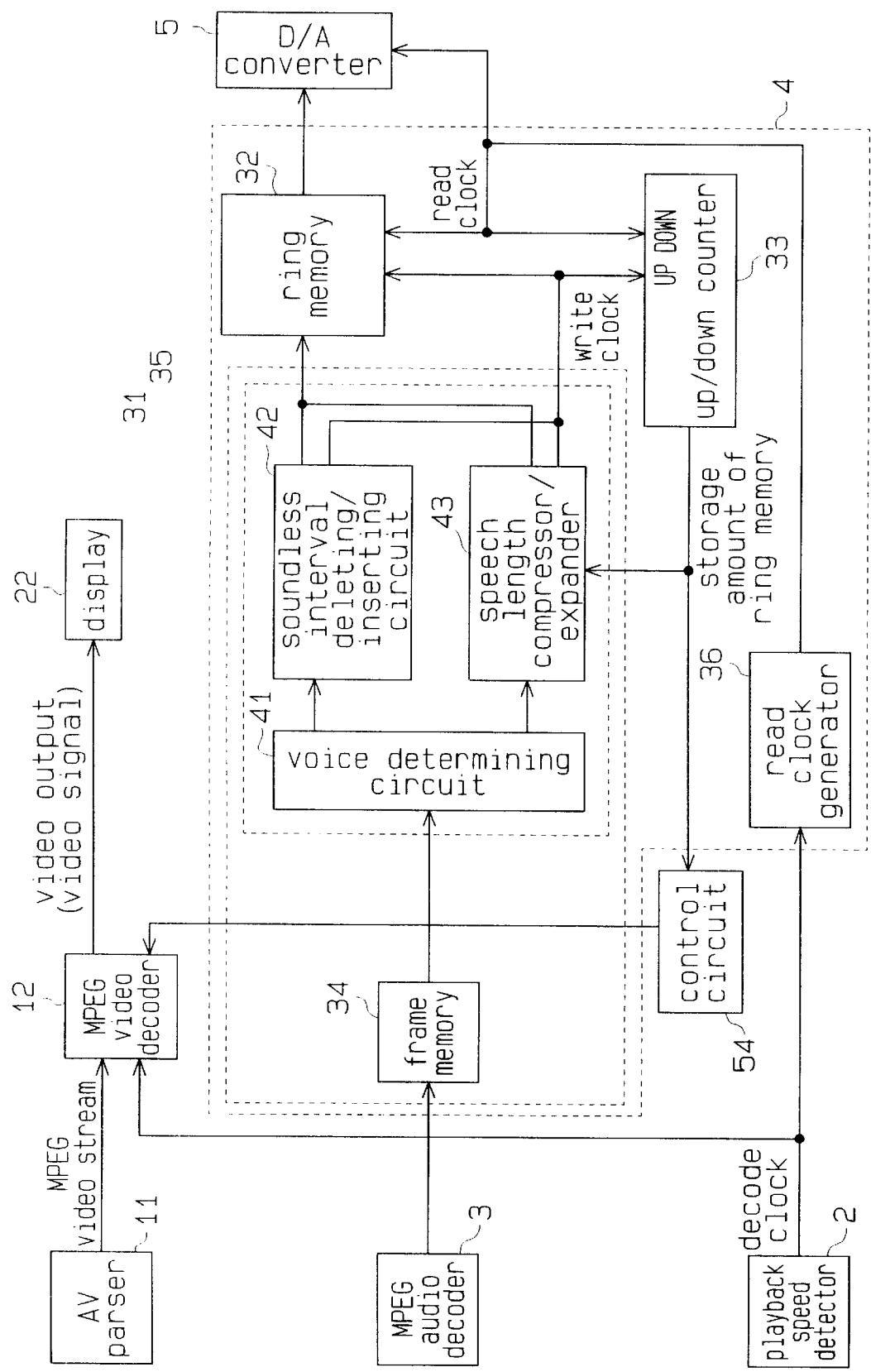
FIG. 10 is a block circuit diagram illustrating an MPEG video/audio reproducing apparatus according to the seventh embodiment of the invention.

The seventh embodiment of this invention will now be described with reference to the accompanying drawings. To avoid a redundant description, like or same reference numerals are given to those components that are the same as the corresponding components of the first embodiment. As shown in FIG. 10, the MPEG video/audio reproducing apparatus according to the seventh embodiment has the MPEG audio reproducing apparatus 1, the AV parser 11, the MPEG video decoder 12, and a control circuit 54.

The control circuit 54 generates a control signal to control the operation speed of the video decoder 12 in accordance with the amount of converted data in the ring memory 32, which has been detected by the up/down counter 33, and supplies the control signal to the video decoder 12. The video decoder 12 controls the self-operation timing in accordance with the control signal. This control allows the converted data read from the ring memory 32 and the video signal produced by the video decoder 12 to be synchronized with each other.

As discussed above, the delay time of the voice speed conversion processor 4 is essentially determined by the delay time of the ring memory 32. The delay time of the ring memory 32 is correlated with the amount of data stored therein; the greater the storage amount is, the greater the delay time becomes. Therefore, the control of the operation timing of the video decoder 12 in accordance with the storage amount of the ring memory 32 permits the audio signal converted by the voice speed conversion and read from the ring memory 32 and the video signal to be synchronized with each other.

EIGHTH EMBODIMENT

Figure 11:
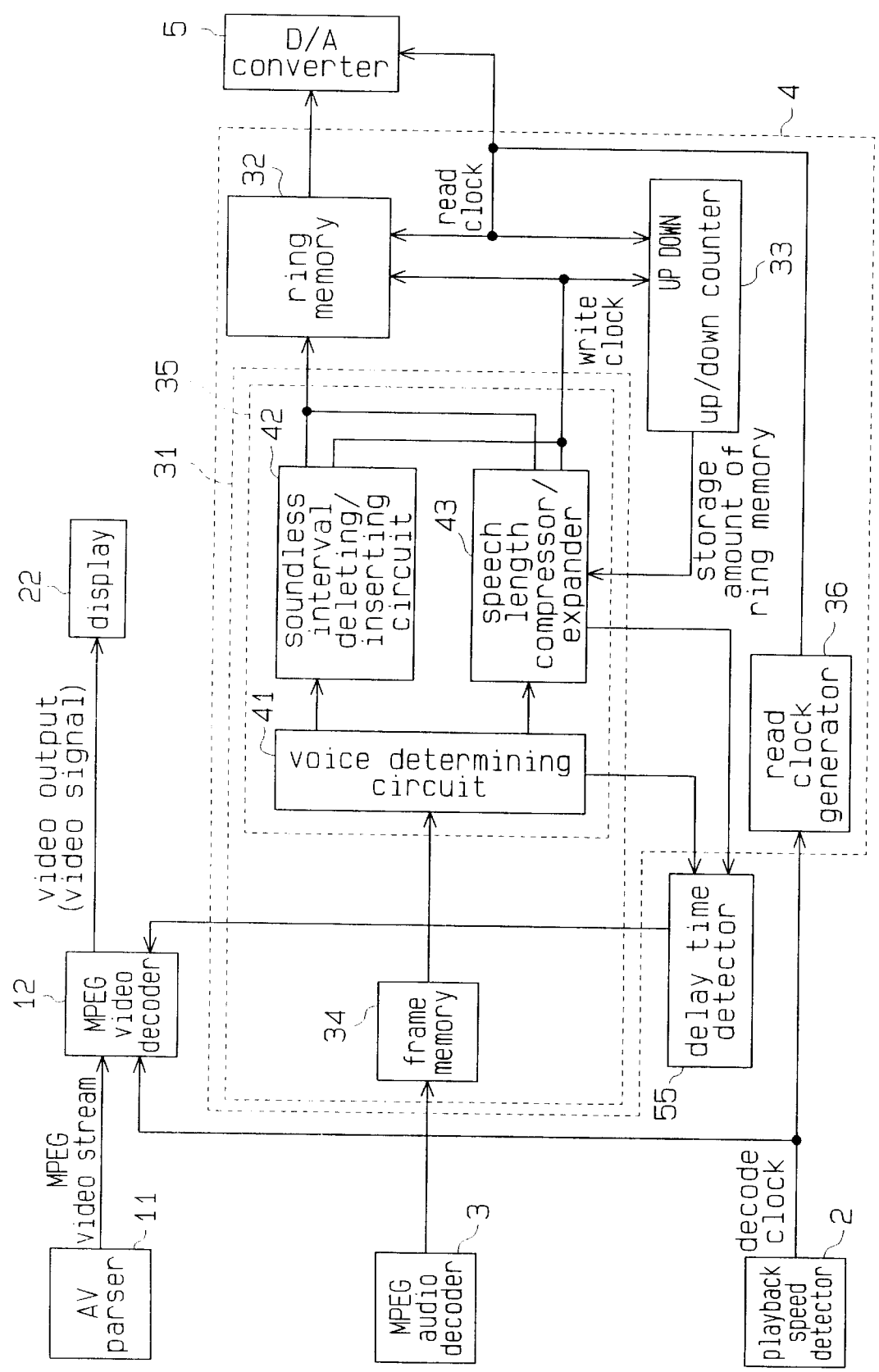
FIG. 11 is a block circuit diagram illustrating an MPEG video/audio reproducing apparatus according to the eighth embodiment of the invention.

The eighth embodiment of this invention will now be described referring to the accompanying drawings. To avoid a redundant description, like or same reference numerals are given to those components that are the same as the corresponding components of the first embodiment. As shown in FIG. 11, the MPEG video/audio reproducing apparatus according to the eighth embodiment has the MPEG audio reproducing apparatus 1, the AV parser 11, the MPEG video decoder 12, and a delay time detector 55.

The delay time detector 55 detects the delay time of the voice speed conversion processor 4 and supplies the detection signal to the MPEG video decoder 12. The video decoder 12 controls the self-operation timing based on the detection signal. This control allows the converted data read from the ring memory 32 and the video signal produced by the video decoder 12 to be synchronized with each other.

As discussed above, the result of the processing in the voice determining circuit 41 includes voice information indicating if the audio signal is located in a sound interval. The result of the processing in the speech length compressor/expander 43 includes compression/expansion information associated with the compression/expansion ratio of an audio signal. The delay time detector 55 detects (computes) the delay time of the voice speed conversion processor 4 based on the voice information and compression/expansion information. The video decoder 12 delays the self-operation timing by the detected delay time. Consequently, the audio signal converted by the voice speed conversion and read from the ring memory 32 and the video signal are synchronized with each other regardless of the delay time of the voice speed conversion processor 4.

Figure 12:
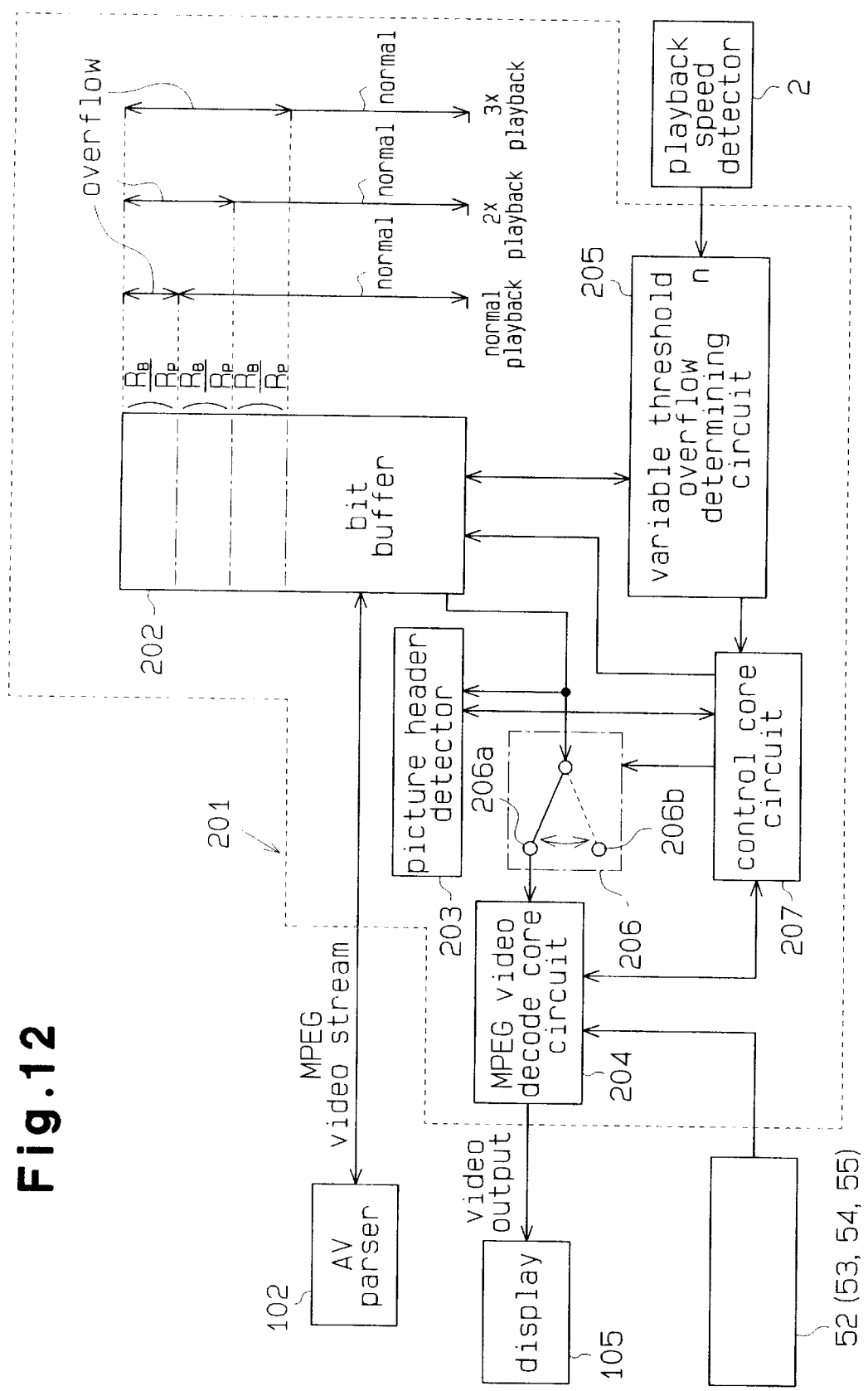
FIG. 12 is a block circuit diagram illustrating an MPEG video decoder included in the MPEG video/audio reproducing apparatus.

MPEG Video Decoder Having A Variable Speed Playback Function According To The First Example FIG. 12 is a block diagram showing a MPEG video decoder 12 having a fast playback function. The MPEG video decoder 12 according to the first example comprises a bit buffer 202, a picture header detector 203, an MPEG video decode core circuit (hereinafter called decode core circuit) 204, a variable threshold overflow determining circuit (hereinafter called determining circuit) 205, a picture skip circuit 206, and a control core circuit 207. Those circuits 203 to 207 are preferably mounted on a single large-scale integration (LSI) chip. The control core circuit 207 controls the individual circuits 202 to 206. An MPEG video stream transferred from AV parser 102 is supplied to the bit buffer 202.

The bit buffer 202 is a ring buffer equipped with RAM (Random Access Memory) having a FIFO structure for sequentially storing a video stream. The picture header detector 203 detects a picture header at the head of each picture included in the video stream that is stored in the bit buffer 202. The picture header defines the type as one of I-, P- and B-pictures.

In accordance with a detection signal from the picture header detector 203 and a decision signal of the determining circuit 205, which will be discussed later, the control core circuit 207 controls the bit buffer 202 in such a way as to read a video stream corresponding to the proper number of pictures every frame period. The video stream read from the bit buffer 202 remains in bit buffer 202 after reading. The video stream of each picture read from the bit buffer 202 is transferred via the picture skip circuit 206 to the decode core circuit 204.

The decode core circuit 204 receives the video stream of each picture and decodes it in conformity to the MPEG video part to produce a video output signal picture by picture. This video output signal is supplied to a external display 105 which is connected to the MPEG video decoder 12.

The decode core circuit 204 further receives the index signal detected by the index detector 52 in the second to fifth embodiments, the detection signal detected by the delay time detector 53 in the sixth embodiment, the control signal generated by the control circuit 54 in the seventh embodiment or the detection signal detected by the delay time detector 55 in the eighth embodiment. The decode core circuit 204 controls the self-decoding operation timing in accordance with received signal. The operation timing of the MPEG video decoder 12 is controlled by above control. As apparent from above, the operation speed of the MPEG video decoder 12 is controlled in accordance with one of the signals from circuits 52, 53, 54 and 55 in the second to eighth embodiments. Instead of above discussed control, a delay circuit may coupled between the video decoder 12 and the display 22. In accordance with one of the signals from circuits 52, 53, 54 and 55, this delay circuit controls the propagation delay time of the video signal to be provided to the display 22 from the delay circuit in such a way to synchronize the audio signal and the video signal with each other.

The picture skip circuit 206 has a first node 206a and a second node 206b and selectively switches the connection to the nodes 206a and 206b under the control of the control core circuit 207. When the picture skip circuit 206 is set to the first node 206a, pictures are transferred to the decode core circuit 204 from the bit buffer 202. When the picture skip circuit 206 is set to the second node 206b, on the other hand, pictures are not transferred to the decode core circuit 204 and are skipped. As a result, a video stream to be transferred to the decode core circuit 204 is thinned in units of pictures by the picture skip circuit 206.

The determining circuit 205 changes a threshold value Bthn of the occupying amount Bm of pictures (video stream) in the bit buffer 202 in accordance with the decode clock signal generated by the playback speed detector 2, and compares the actual occupying amount Bm with the threshold value Bthn. The determining circuit 205 computes a ratio of the frequency of actual decode clock signal generated by the playback speed detector 2 to the frequency of decode clock signal in the normal playback mode. The computed ratio corresponds to magnification n for the normal playback speed. In the 2× playback mode, for example, the magnification n=2 and the threshold value Bthn becomes Bth2. In the normal playback mode, the magnification n=1 and the threshold value Bthn becomes Bth1. When the occupying amount Bm of the bit buffer 202 is not greater than the threshold value Bthn, the determining circuit 205 determines that the bit buffer 202 is unlikely to overflow and that the occupying amount is normal. In accordance with this decision, the control core circuit 207 controls the bit buffer 202 in such a way as to read out a video stream for one picture. Further, the control core circuit 207 sets the picture skip circuit 206 to the first node 206a so that pictures are transferred to the decode core circuit 204.

Figure 13:
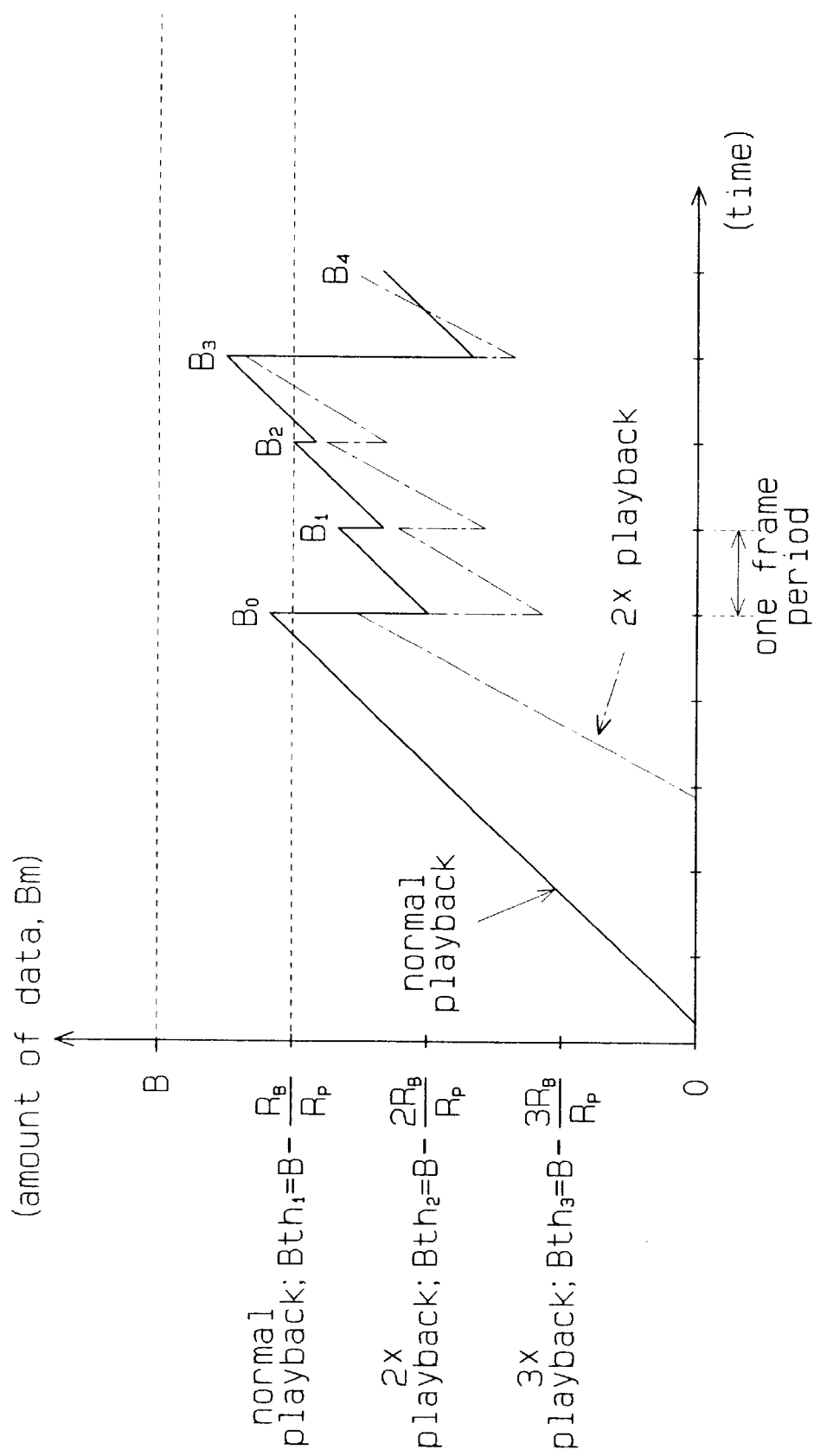
FIG. 13 is a graph showing the relationship between the occupied amount of a video stream in a bit buffer in the first example of the video decoder and time.

FIG. 13 is a graph showing the relationship between the occupying amount of a video stream in the bit buffer 202 and the time in the normal playback mode according to the first example.

The occupying amount Bm of the bit buffer 202 rises at the bit rate $R_B$, which represents the slope of the graph. The bit rate $R_B$ of a video stream is defined as given by an equation (1) below $$R_B = 400 \times BR \tag{1}$$

where BR is the bit rate of a sequence header provided at the head of a sequence.

The capacity B of the bit buffer 202 is defined as given by the following equation (2)

$$B = 16 \times 1024 \times VBS \tag{2}$$

where VBS is the video buffering verifier (VBV) buffer size of the sequence header.

The amount of data, X, of a video stream to be supplied to the bit buffer 202 in one frame period is defined as given by the following equation (3)

$$X = R_B / R_P \tag{3}$$

where $R_P$ is the picture rate of a video stream which is defined by the picture rate of the sequence header. A video stream for one picture is read from the bit buffer 202 without pause in one frame period, and is decoded by the decode core circuit 205. The occupying amount Bm immediately after the continuous reading of the video stream is defined as given by the following equation (4). The occupying amount Bm is indicated by "$B_0$" to "$B_6$" as shown in FIG. 11.

$$0 < Bm < B - X = B - (R_B / R_P) \tag{4}$$

Defining the occupying amount Bm so as to satisfy the condition of the equation (4) prevents the overflow and underflow of the bit buffer 202. In other words, the occupying amount Bm that exceeds a threshold value represented by B−X indicates a high probability that the bit buffer 202 would overflow.

In the normal playback mode, the bit rate $R_B$, the picture rate $R_P$ and the capacity B are so defined as to meet the equation (4). Further, setting the capacity B of the bit buffer 202 as given by the equation (2) prevents the overflow and underflow of the bit buffer 202 even if the picture skip circuit 206 is kept set to the first node.

In the normal playback mode, the occupying amount Bm, indicated by $B_0$ to $B_4$, immediately after the continuous reading of one picture of data from the bit buffer 202 is defined based on the threshold value Bth1 so as to satisfy the following equation (5).

$$0 < Bm < Bth1 < B \qquad (5)$$

The threshold value Bth1 is set as expressed by an equation (6) below in association with the equation (4).

$$Bth1 = B - X = B - (R_B/R_P) \qquad (6)$$

Actually, even if the capacity B is set as given by the equation (2), the bit buffer 202 may overflow when the picture skip circuit 206 is kept set to the first node 206a.

According to the video decoder 12 of the first example, when the occupying amount Bm of the bit buffer 202 exceeds the threshold value, first, the determining circuit 205 determines that the bit buffer 202 is apt to overflow in the normal playback mode. Then, the control core circuit 207 controls the bit buffer 202 in such a manner that a video stream for the proper number of pictures is read out from the bit buffer 202 to set the occupying amount Bm smaller than the threshold value Bth1. Further, the picture skip circuit 206 is switched to the second node 206b to skip all the read pictures. Therefore, the first example prevents the bit buffer 202 from overflowing in the normal playback mode.

The occupying amount Bm in the fast playback mode rises at the bit rate $n \times R_B$ of the video stream, which represents the slope of the graph. For example, the occupying amount Bm in the 2× playback mode rises along the graph whose slope is given by the bit rate $2 \times R_B$. In the fast playback mode, therefore, the occupying amount Bm, indicated by $B_0$ to $B_4$, immediately after the continuous reading of one picture of data from the bit buffer 202 is defined based on the threshold value Bthn so as to satisfy an equation (7) below.

$$0 < Bm < Bthn \qquad (7)$$

The threshold value Bthn is set as expressed by the following equation (8).

$$Bthn = B - n \times X = B - (n \times R_B/R_P) \qquad (8)$$

When the occupying amount Bm exceeds the threshold value Bthn in the fast playback mode, the determining circuit 205 determines that the bit buffer 202 may overflow. This may occur, for example, when the occupying amount Bm exceeds the threshold value Bth2 (=B−(2×$R_B$/$R_P$)) in the 2× playback mode and when the occupying amount Bm exceeds the threshold value Bth3 (=B−(3×$R_B$/$R_P$)) in the 3× playback mode. In accordance with the decision signal, the control core circuit 207 controls the bit buffer 202 in such a manner that a video stream for the proper number of pictures is read out from the bit buffer 202 and is skipped to set the occupying amount Bm smaller than the threshold value Bthn. This control prevents the bit buffer 202 from overflowing in the fast playback mode. In the normal playback mode and fast playback mode, the control core circuit 207 can easily control the bit buffer 202 and the picture skip circuit 206 based on the threshold value. This design eliminates the need for a microcomputer for the control core circuit 207. Further, the mounting of the individual circuits 203 to 207 on a single LSI chip in the first example contributes to reducing the manufacturing cost and making the overall apparatus compact.

The overflow of the bit buffer 202 should be avoided at any cost especially while the decode core circuit 204 is decoding an arbitrary picture. Suppose that the bit buffer 202 overflows while the decode core circuit 204 is decoding an arbitrary picture. Then, although some of the video stream of the picture that is being decoded still remains in the bit buffer 202, it is overwritten with a newly supplied video stream. Consequently, the remaining video stream of that picture is destroyed and lost. It therefore becomes impossible for the decode core circuit 204 to finish decoding the picture, thus disabling the production of the video output of the picture.

According to the first example, therefore, the determining circuit 205 checks the free space in the bit buffer 202 when the picture header detector 203 detects a picture header to determine if there is a sufficient space (n×X=n×$R_B$/$R_P$) secured. When the determining circuit 205 determines that there is insufficient space, the control core circuit 207 skips the picture read from the bit buffer 202 via the picture skip circuit 206 based on that picture header. Next, the determining circuit 205 checks the free space in the bit buffer 202 again when the picture header detector 203 detects the next picture header. The time needed for those decisions and the skipping process is considerably shorter than the time for the decoding process by the decode core circuit 204. Therefore, no problem will arise even when the decoding process starts after a sufficient space is secured in the bit buffer 202.

The reason why the free space in the bit buffer 202 is checked is that the amount of picture data is not constant. The amount of data of one picture ranges from 0 to 40 bytes, and this amount becomes apparent when the decode core circuit 204 finishes the decoding. Further, the time for decoding one picture is normally about ⅓ to ¾ of one frame period though it varies in accordance with the amount of data of that picture and the operation speed of the decode core circuit 204. When the amount of data of a picture is 0 bytes, for example, the occupying amount Bm of the bit buffer 202 before the reading of this picture does not differ from that after the picture reading. Therefore, skipping the picture of 0 bytes makes it impossible to avoid the overflow of the bit buffer 202. In other words, when the bit buffer 202 has enough free space for the amount of data that is supplied in one frame period, it is possible to avoid the overflow of the bit buffer 202 regardless of the amount of data of a read picture.

The amount of data of a video stream to be supplied to the bit buffer 202 in one frame period is n×X=n×$R_B$/$R_P$. The overflow of the bit buffer 202 can therefore be avoided if the bit buffer 202 has free space equal to or greater than this data amount. This free space is the capacity B of the bit buffer 202 minus the threshold value Bthn as given by the equation (8). When the occupying amount Bm is not greater than the threshold value Bthn, therefore, the determining circuit 205 determines that a sufficient free space is secured in the bit buffer 202. That is, setting the threshold value Bthn as indicated by the equation (8) can surely avoid the overflow of the bit buffer 202.

According to the first example, it is determined if the bit buffer 202 is likely to overflow, before the decode core circuit 204 starts decoding an arbitrary picture. More specifically, the decision on the overflow of the bit buffer 202 is made when the picture header detector 203 detects a picture header, and it is then determined whether or not to skip the picture in accordance with the decision. This approach prevents the video stream of a picture being transferred to the decode core circuit 204 from being interrupted during the transfer. The decode core circuit 204 therefor can decode a P-picture and a B-picture as well as an I-picture. As a result, the occurrence of frame dropping will be decreased. At the time of a fast playback two to four times faster than the normal playback, it is possible to display pictures at a rate of several frames per second. It is thus possible to attain moving pictures which show a smooth motion in the fast playback mode, and to significantly improve the picture quality.

The bit buffer 202 may underflow when the picture header detector 203 detects a picture header or after the decode core circuit 204 starts decoding. The problem of underflow is solved by successive reading of a video stream for one picture from the bit buffer 202 as soon as a video stream is provided to the bit buffer 202.

MPEG Decoder According to The Second Example

The MPEG decoder according to the second example will now be described. The MPEG video decoder according to the second example has the same general structure as that of the first example. The determining circuit 205 in the second example however uses two threshold values B2thn and B3thn, which are so set as to meet the condition given in an equation (9).

$$0 < B3thn < B2thn < B \qquad (9)$$

It is preferable that those threshold values B2thn and B3thn are set in accordance with the playback speed as in the first example and also based on the result of the actual check on the quality of moving pictures to be displayed on the display 105. The determining circuit 205 compares the occupying amount Bm of the bit buffer 202 with the threshold values B2thn and B3thn and determines which one of the following three cases C1 to C3 the current case is.

Case C1 (Bm<B3thn)

When the occupying amount Bm of the bit buffer 202 does not exceed the threshold value B3thn, the determining circuit 205 determines that the bit buffer 202 is unlikely to overflow and is normal. In accordance with this decision, the control core circuit 207 controls the bit buffer 202 in such a way as to read a video stream for one picture from the bit buffer 202. Further, the control core circuit 207 switches the picture skip circuit 206 to the first node 206a to transfer the video stream of that picture to the decode core circuit 204.

Case C2 (B2thn<Bm)

When the occupying amount Bm has exceeded the threshold value B2thn, the determining circuit 205 sets a first flag as long as the picture read from the bit buffer 202 is an I- or P-picture. When and only when the first flag is set and a picture read following the I- or P-picture is a B-picture, the control core circuit 207 skips that B-picture even if the occupying amount Bm becomes smaller than the threshold value B3thn.

Case C3 (B3thn<Bm<B2thn):

When the occupying amount Bm is greater than the threshold value B3thn but is not greater than the threshold value B2thn, the determining circuit 205 sets a second flag as long as the read picture is a P-picture. When and only when the second flag is set and a picture read following the P-picture is a B-picture, the control core circuit 207 skips that B-picture even if the occupying amount Bm becomes smaller than the threshold value B3thn.

Figure 14:
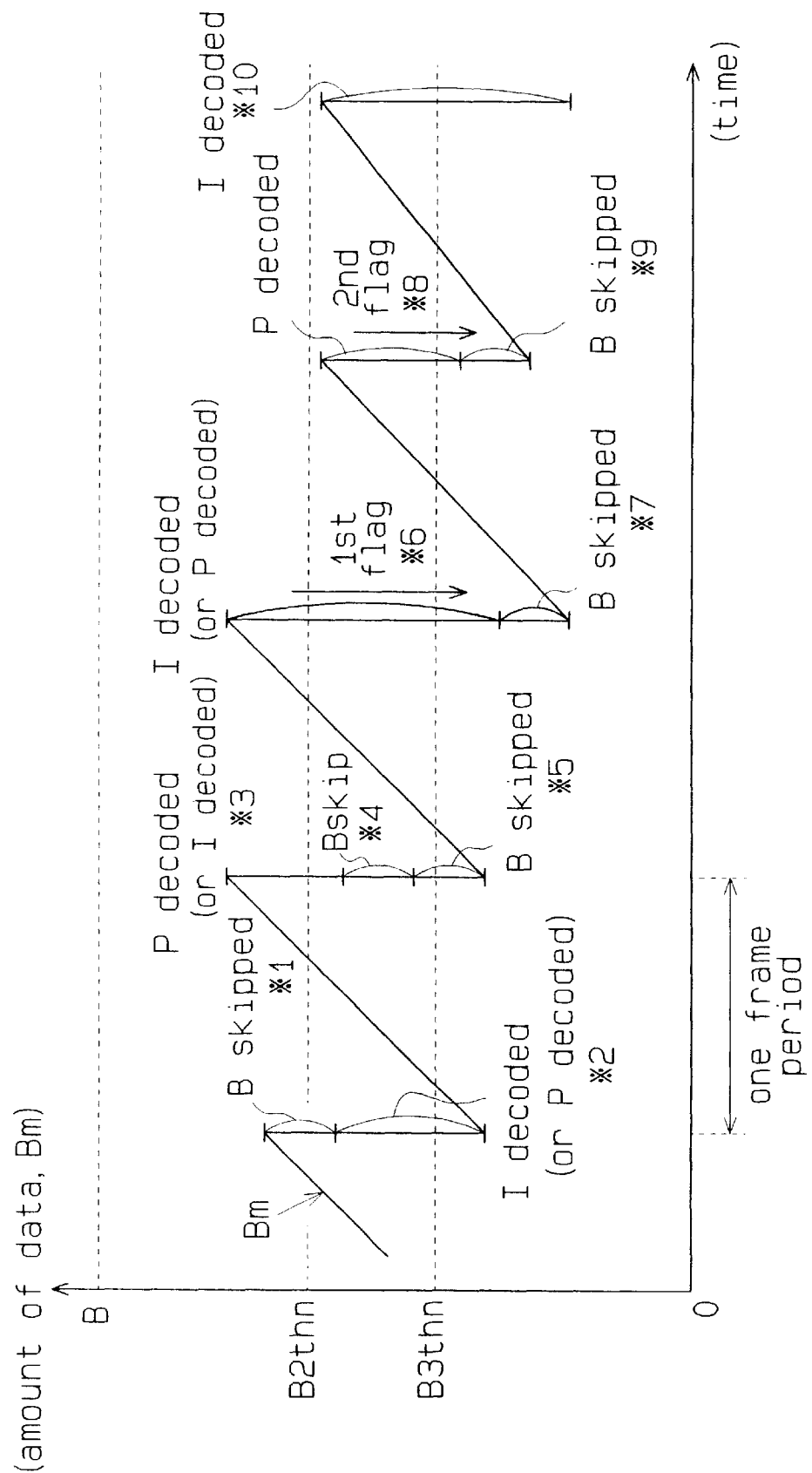
FIG. 14 is a graph showing the relationship between the occupied amount of a video stream in a bit buffer in the second example of the video decoder and time.

FIG. 14 is a graph showing the relationship between the occupying amount of a video stream in the bit buffer 202 according to the second example and time.

When the occupying amount Bm is greater than the threshold value B3thn, if it is a B-picture which has been read, this B-picture is not decoded but is skipped (see *1 in FIG. 14). When the occupying amount Bm is still greater than the threshold value B3thn even after the skipping of the B-picture, an I- or P-picture read after that B-picture is decoded (see *2).

When the occupying amount Bm is greater than the threshold value B3thn, if it is an I- or P-picture which has been read, this picture is decoded (see *3 in the diagram). When the occupying amount Bm is still greater than the threshold value B3thn even after the decoding of the I- or P-picture, a B-picture read after that I- or P-picture is not decoded but is skipped (see *4). The skipping of this B-picture is repeated until the occupying amount Bm becomes smaller than the threshold value B3thn (see *5).

The reason why a B-picture is skipped with priority over an I- or P-picture is because the data of a B-picture produced by the bidirectional prediction has a lower significance than the data of I- and P-pictures. The skipping of a B-picture with priority over an I- or P-picture permits I- and P-pictures to be decoded as much as possible. Therefore, the number of frames that are dropped from moving pictures to be displayed becomes less than that in the first example. Accordingly, it is possible to attain moving pictures that show a smoother motion in the fast playback mode with a higher picture quality.

When the occupying amount Bm becomes greater than the threshold value B2thn, if it is an I- or P-picture which has been read, this picture is decoded and the determining circuit 205 sets the first flag (see *6 in the diagram). When the first flag is set and a B-picture is read after the I- or P-picture, this B-picture is skipped even if the occupying amount Bm becomes smaller than the threshold value B3thn (see *7). The previous skipping of the B-picture that is read after an I- or P-picture secures a greater free space to prevent the overflow thereof.

When the occupying amount Bm becomes greater than the threshold value B3thn but is smaller than the threshold value B2thn, if it is a P-picture that has been read, this picture is decoded and the determining circuit 205 sets the second flag (see *8 in the diagram). When the second flag is set and a B-picture is read after the P-picture, this B-picture is skipped even if the occupying amount Bm becomes smaller than the threshold value B3thn (see *9). The previous skipping of the B-picture that is read after a P-picture can reduce the occupying amount Bm as much as possible to prevent the bit buffer 202 from overflowing. This overflow prevention scheme avoids overflow of the bit buffer 202.

When the occupying amount Bm becomes greater than the threshold value B3thn but is smaller than the threshold value B2thn, if it is an I-picture that has been read, this picture is decoded and the determining circuit 205 does not set the second flag (see *10 in the diagram). When the second flag is not set and when the occupying amount Bm is smaller than the threshold value B3thn, a B-picture read after the I-picture is decoded without being skipped.

The first and second flags are set in the above-described manner in order to make the condition for skipping a B-picture after the reading of an I-picture different from the condition for skipping a B-picture after the reading of a P-picture. This will be discussed below more specifically. The amount of data of an I-picture is two to three times that of a P-picture. Thus, the degree of the reduction of the occupying amount Bm after the reading of an I-picture is greater than that after the reading of a P-picture. In other words, the probability of the overflow of the bit buffer 202 after the reading of an I-picture is smaller than that after the reading of a P-picture. In this respect, the reference value or the threshold value B2thn for setting the first flag in association with an I-picture is set higher than the reference value or the threshold value B3thn for setting the second flag in association with a P-picture. Accordingly, the condition for skipping a B-picture after the reading of an I-picture becomes more relaxed than the skipping condition after the reading of a P-picture. Even if the occupying amount Bm is smaller than the threshold value B3thn, the number of B-pictures which are to be skipped unnecessarily for the prevention becomes smaller. In other words, the number of B-pictures to be decoded is increased.

The following shows the results of a simulation conducted in the fast playback mode according to the second example. A1 and A2 indicate the types of the GOP structure of a video stream read from a recording medium.

A1: IBPBPBPBP

A2: IBBPBBPBBPBBPBBIBP

[1] In 2× playback mode: For the type A1, all of I- and P-pictures are decodable so that moving pictures are displayed at a full rate of 30 frames per second. For the type A2, all of I- and P-pictures and some of B-pictures are decodable so that moving pictures are displayed at a rate of 25 or more frames per second.

[2] In 4× playback mode: For both the types A1 and A2, an I-picture and the subsequent three to four P-pictures are decodable so that moving pictures are displayed at a rate of 15 or more frames per second.

Although only eight embodiments of the present invention have been described herein, it should be apparent to those skilled in the art that the present invention may be embodied in many other specific forms without departing from the spirit or scope of the invention. Particularly, it should be understood that this invention may be embodied in the following forms:

Two or more of the second to eighth embodiments may be combined.

In the first to eighth embodiments, the signal processing in individual circuits 1 to 55 may be replaced with software-based signal processing which is accomplished by using a CPU.

Therefore, the present examples and embodiments are to be considered as illustrative and not restrictive and the invention is not to be limited to the details given herein, but may be modified within the scope of the appended claims.

What is claimed is:

1. An audio reproducing apparatus comprising:

an audio decoder for decoding an audio data stream to produce an audio signal, said audio data stream having a higher or lower bit rate than a normal bit rate; and a voice speed converting unit receiving said audio signal and performing voice speed conversion on said audio signal, wherein said voice speed converting unit performs voice speed conversion on said audio signal such that when said bit rate is higher than said normal bit rate, a pitch of a first reproduced sound interval based on said higher bit rate is substantially the same as a pitch of a second reproduced sound interval in a normal playback mode and a voice speed in said first reproduced sound interval approaches a voice speed in a sound interval in said normal playback mode, and when said bit rate is lower than said normal bit rate, a time length of at least one of a third reproduced sound interval based on said lower bit rate and a soundless interval is selectively adjusted.

2. The audio reproducing apparatus according to claim 1, said voice speed converting unit further comprising:

a memory for storing said audio signal; and a detector for detecting an amount of said audio signal stored in said memory;

wherein said voice speed converting unit performs voice speed conversion on said audio signal by adjusting a time length of said first and third sound intervals in accordance with said storage amount of said audio signal in said memory.

3. An audio reproducing apparatus comprising:

an audio decoder for decoding an audio data stream to produce an audio signal, said audio data stream having a higher or lower bit rate than a normal bit rate, said signal including a plurality of sound intervals and at least one soundless interval; and a voice speed converting unit for receiving said audio signal and performing voice speed conversion on said audio signal;

wherein said voice speed converting unit performs first voice speed conversion on said audio signal when said bit rate is higher than said normal bit rate, such that a time length of a sound interval reproduced is expanded and time lengths of individual soundless intervals are shortened, and performs second voice speed conversion on said audio signal when said bit rate is lower than said normal bit rate, said second voice speed conversion being such that individual ones of said sound intervals are linked by eliminating any of said individual soundless intervals that are between said individual ones of said sound intervals and a soundless interval is inserted after a sound interval resulting from said linkage.

4. The audio reproducing apparatus according to claim 3, said voice speed converting unit further comprising:

a memory for storing said audio signal; and a detector for detecting an amount of said audio signal stored in said memory, wherein said voice speed converting unit performs voice speed conversion on said audio signal by adjusting one of a compression ratio of said time length of said sound interval and an expansion ratio of said time length of said sound interval in accordance with said storage amount of said audio signal in said memory.

5. The audio reproducing apparatus according to claim 3, said voice speed converting unit further comprising:

a memory for storing said audio signal;

a detector for detecting an amount of said audio signal stored in said memory;

a voice determining circuit for determining a sound interval and a soundless interval included in said audio signal;

a soundless interval deleting/inserting circuit for eliminating and inserting said soundless interval; and a compressor/expander for performing one of compression of said time length of said sound interval and expansion of said time length of said sound interval in accordance with said storage amount of said audio signal in said memory.

6. An audio/video reproducing apparatus for reproducing an audio signal and a video signal from a system bit stream, comprising:

an audio decoder for decoding an audio data stream contained within the system bit stream to produce said audio signal, said audio data stream having a higher or lower bit rate than a normal bit rate;

a voice speed converting unit for receiving said audio signal and performing voice speed conversion on said audio signal;

wherein said voice speed converting unit performs voice speed conversion such that when said bit rate is higher than said normal bit rate, a pitch of a first reproduced sound interval based on said higher is the same as a pitch of a second reproduced sound interval in a normal playback mode, and a voice speed in said first reproduced sound interval approaches a voice speed in a sound interval in said normal playback mode, and when said bit rate is lower than said normal bit rate, a time length of at least one of a third reproduced sound interval and a soundless interval is selectively adjusted; and a video decoder for decoding a video data stream contained within the system bit stream to produce a video signal.

7. The audio/video reproducing apparatus according to claim 6, said voice speed converting unit further comprising:

a memory for storing said audio signal; and a detector for detecting an amount of said audio signal stored in said memory, wherein said voice speed converting unit performs voice speed conversion on said audio signal by adjusting a time length of said sound interval in accordance with said storage amount of said audio signal in said memory.

8. The audio/video reproducing apparatus according to claim 7, further comprising:

an index adding circuit for adding an index signal as information associated with time to said audio signal before said audio signal is stored in said memory; and an index detector for detecting said index signal added to said audio signal read from said memory, detecting a signal delay time in said voice speed converting unit from time information acquired from said index signal and current time information, and supplying a signal indicating said signal delay time to said video decoder, wherein said video decoder controls a self-operation timing based on said signal indicating said signal delay time.

9. The audio/video reproducing apparatus according to claim 7, further comprising:

a control circuit for generating a control signal to synchronize said audio signal undergone voice speed conversion with said video signal in accordance with said storage amount of said audio signal in said memory, wherein said video decoder controls a self-operation timing in accordance with said control signal.

10. An audio/video reproducing apparatus for reproducing an audio signal and a video signal from a system bit stream, comprising:

an audio decoder for decoding an audio data stream contained within the system bit stream to produce said audio signal, said audio data stream having a higher or lower bit rate than a normal bit rate, said audio signal including a sound interval and a soundless interval;

a voice speed converting unit for receiving said audio signal and performing voice speed conversion on said audio signal;

wherein said voice speed converting unit performs first voice speed conversion on said audio signal when said bit rate is higher than said normal bit rate, such that a time length of a sound interval reproduced is expanded and time lengths of individual soundless intervals are shortened, and performs second voice speed conversion on said audio signal when said bit rate is lower than said normal bit rate, said second voice speed conversion being such that individual ones of said sound intervals are linked by eliminating any of said individual soundless intervals that are between said individual ones of said sound intervals and a soundless interval is inserted after a sound interval resulting from said linkage; and a video decoder for decoding a video data stream contained within the system bit stream to produce a video signal.

11. The audio/video reproducing apparatus according to claim 10, said voice speed converting unit further comprising:

a memory for storing said audio signal; and a detector for detecting an amount of said audio signal stored in said memory, wherein said voice speed converting unit performs voice speed conversion on said audio signal by performing one of compression of said time length of said sound interval and expansion of said time length of said sound interval in accordance with said storage amount of said audio signal in said memory.

12. The audio/video reproducing apparatus according to claim 11, further comprising:

an index adding circuit for adding an index signal as information associated with time to said audio signal before said audio signal is stored in said memory; and an index detector for detecting said index signal added to said audio signal read from said memory, detecting a signal delay time in said voice speed converting unit from time information acquired from said index signal and current time information, and supplying a signal indicating said signal delay time to said video decoder, wherein said video decoder controls a self-operation timing based on said signal indicating said signal delay time.

13. The audio/video reproducing apparatus according to claim 11, further comprising:

a control circuit for generating a control signal to synchronize said audio signal after having undergone voice speed conversion with said video signal in accordance with said storage amount of said audio signal in said memory, wherein said video decoder controls a self-operation timing in accordance with said control signal.

14. The audio/video reproducing apparatus according to claim 10, said voice speed converting unit further comprising:

a memory for storing said audio signal;

a detector for detecting an amount of said audio signal stored in said memory;

a voice determining circuit for determining a sound interval and a soundless interval included in said audio signal;

a soundless interval deleting/inserting circuit for eliminating and inserting said soundless interval; and a compressor/expander for performing one of compression of said time length of said sound interval and expansion of said time length of said sound interval in accordance with said storage amount of said audio signal in said memory.

15. The audio/video reproducing apparatus according to claim 14, further comprising:

an index adding circuit for adding an index signal as information associated with time to said audio signal before said audio signal is stored in said memory; and an index detector for detecting said index signal added to said audio signal read from said memory, detecting a signal delay time in said voice speed converting unit from time information acquired from said index signal and current time information, and supplying a signal indicating said signal delay time to said video decoder, wherein said video decoder controls a self-operation timing based on said signal indicating said signal delay time.

16. The audio/video reproducing apparatus according to claim 14, further comprising:

a control circuit for generating a control signal to synchronize said audio signal after having undergone voice speed conversion with said video signal in accordance with said storage amount of said audio signal in said memory, wherein said video decoder controls a self-operation timing in accordance with said control signal.

17. The audio/video reproducing apparatus according to claim 14, further comprising:

a delay time detector for detecting a signal delay time in said voice speed converting unit based on a determination result from said voice determining circuit and said bit rate of said audio data stream, and supplying a detection signal indicative of said detected delay time to said video decoder, wherein said video decoder controls a self-operation timing to synchronize said audio signal after having undergone voice speed conversion with said video signal in accordance with said detection signal.

18. The audio/video reproducing apparatus according to claim 14, further comprising:

a delay time detector for detecting a signal delay time in said voice speed converting unit based on a determination result from said voice determining circuit and a result of processing in said compressor/expander, and supplying a detection signal indicative of said detected delay time to said video decoder, wherein said video decoder controls a self-operation timing to synchronize said audio signal after having undergone voice speed conversion with said video signal in accordance with said detection signal.

* * * * *